US010891205B1

(12) United States Patent
Trulli, Jr. et al.

(10) Patent No.: US 10,891,205 B1
(45) Date of Patent: Jan. 12, 2021

(54) GEOGRAPHICALLY DISPERSED DISASTER RESTART MULTITENANCY SYSTEMS

(71) Applicant: EMC IP HOLDING COMPANY LLC, Hopkinton, MA (US)

(72) Inventors: Dennis J. Trulli, Jr., Littleton, MA (US); Peter Callewaert, Sint-Amands (BE); Kenneth J. Schopp, West Bend, WI (US)

(73) Assignee: EMC IP Holding Company LLC, Hopkinton, MA (US)

( * ) Notice: Subject to any disclaimer, the term of this patent is extended or adjusted under 35 U.S.C. 154(b) by 220 days.

(21) Appl. No.: 15/886,467

(22) Filed: Feb. 1, 2018

(51) Int. Cl.
 *G06F 11/00* (2006.01)
 *G06F 11/20* (2006.01)
(52) U.S. Cl.
 CPC .... *G06F 11/2023* (2013.01); *G06F 2201/805* (2013.01)
(58) Field of Classification Search
 CPC ............. G06F 11/0727; G06F 11/1464; G06F 11/2002; G06F 11/201; G06F 11/2017; G06F 11/2089; G06F 11/2094
 See application file for complete search history.

(56) References Cited

U.S. PATENT DOCUMENTS

| | | | |
|---|---|---|---|
| 2012/0063458 A1* | 3/2012 | Klink | H04L 29/12367 370/392 |
| 2012/0110588 A1* | 5/2012 | Bieswanger | G06F 8/65 718/104 |
| 2015/0317226 A1* | 11/2015 | Sarfare | G06F 11/203 714/4.11 |

* cited by examiner

*Primary Examiner* — Christopher S McCarthy
(74) *Attorney, Agent, or Firm* — Krishnendu Gupta; Anne-Marie Dinius

(57) ABSTRACT

The system and methods disclosed herein relate to an improved hardware configuration for geographically dispersed data restart ("GDDR") systems. Specifically, the teachings herein allow users to reduce the number of operating systems required to run multiple GDDR systems simultaneously by employing multitenancy principles in the system design. The embodiments cover a system for operating multiple GDDR complexes wherein the individual control systems typically required to run each GDDR complex are combined into a single logical partition. We also disclose methods and computer executable products for operating multiple GDDR complexes wherein the individual control systems typically required to run each GDDR complex are combined into a single logical partition.

5 Claims, 10 Drawing Sheets

GEOGRAPHICALLY DISPERSED DISASTER RESTART MULTITENANCY SYSTEMS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This disclosure relates to geographically dispersed disaster restart data storage systems, and, more particularly, to systems and methods for improving performance and reducing cost by reducing the number of operating systems required to run multiple disparately located data centers.

BACKGROUND

Computer data is vital to today's organizations, and a significant part of protection against disasters is focused on data protection. As solid-state memory has advanced to the point where the cost of memory has become a relatively insignificant factor, organizations can afford to operate with systems that store and process terabytes of data. Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

One of the main goals of data replication is the provision of business resiliency, which generally means the ability for a business to protect employees, assets, and reputation before, during and after an adverse event. One of the most valuable assets that must be protected is data stored within networks. For many businesses, it is critical to have accurate and up-to-date data stored within its network. Using an obvious example, a bank must ensure that its electronic record keeping of daily transactions is both accurate and up-to-the-minute. Deposits, transfers, debits, credits, reconciliations from one bank to another, account closures, and the like must all be accurate and current. The potential for great financial loss, as well as legal liability is at stake.

Financial institutions are not the only businesses requiring business resiliency. Indeed, most modern-day businesses must create and execute plans aimed at achieving and improving business resiliency. Against this backdrop, Dell EMC developed a data recovery architecture it calls Geographically Dispersed Disaster Restart ("GDDR"). GDDR is a mainframe-based software automation package Dell EMC has used to provide equipment and environmental monitoring, alerting and automated restart and recovery in IBM z/OS mainframe multisite environments where EMC Symmetrix (VMAX) Direct Access Storage Devices (DASD) are in use. GDDR Tape provides similar monitoring, alerting and restart capabilities to multisite IBM z/OS environments where Disk Library for mainframe (DLm) has been implemented.

GDDR and GDDR Tape can be implemented separately or together to aid, enhance and provide Geographically Dispersed Disaster Recovery for multisite z/OS environments using both VMAX DASD and DLm storage systems. GDDR software is IBM mainframe-based software. GDDR provides two distinct capabilities. First, GDDR provides continuous monitoring of the storage and environment. When a disruption or failure is detected, GDDR will automatically provide alerting to the mainframe operations staff that a disruption or failure has been detected. Second, GDDR provides Disaster Recovery (DR) automation services. These services are provided via a collection of scripts that can be run on the mainframe to take specific actions and provides automation for both planned and unplanned events Dell EMC offers a unique data consistency solution for customers using both VMAX as their primary mainframe DASD and DLm with VMAX back-end storage for their virtual tape library. Dell EMC Mainframe-Enabler software includes Consistency Group ("ConGroup") and Multi-Session Consistency ("MSC") software packages that run on an IBM z/OS mainframe to provide point in time data consistency across centralized knowledge devices and/or logical unit numbers ("LUN") being replicated using Symmetrix Remote Data Facility (SRDF). ConGroup provides data consistency for synchronous replication links (SRDF/S) while MSC provides data consistency for asynchronous replication links (SRDF/A).

Using the full GDDR product, two-site, three-site, referred to as STAR, and four-site, referred to as a SQAR, VMAX SRDF configurations can guarantee that devices/LUNs defined in a single consistency group will be maintained in a single point in time, ensuring that restart at a data recovery site can always be performed. For more information on Dell EMC's GDDR, see http://ourdigitalmags.com/publication/?i=448175&article_id=2918444&view=articleBrowser&ver=html5#{"issue_id":448175,"numpages":1,"view":"articleBrowser","article_id":"2918444"}, the entire contents of which are hereby incorporated by reference.

Although GDDR systems provide data redundancy, they require a dedicated logical partition for each control-system instance running within the system. A logical partition ("LPAR") is the division of a computer processor's memory and storage into multiple sets of resources so that each set of resources can be operated independently with its own operating system instance and applications. An LPAR is also sometimes referred to as an operating system, a mainframe, or a z/OS throughout this specification. The number of logical partitions that can be created depends on the system's processor model and available resources. Typically, partitions are used for different purposes such as database operation, client/server operation, or to separate test and production environments.

With the existing GDDR solution, customers must have a dedicated mainframe LPAR for each GDDR C-system instance. This results in additional hardware costs for each additional GDDR-managed storage configuration. In order to reduce the number of operating systems, and therefore the total cost, required for a GDDR system, it is desirable to allow multiple GDDR complexes, defined below, managing different storage configurations to share the same set of control systems. A significant challenge in realizing this configuration is ensuring the autonomy of the various GDDR multitenancy system embodiments.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter that is set forth by the claims presented below. All examples and features mentioned below can be combined in any technically possible way.

The systems and methods disclosed herein decrease the number of mainframe LPARs that must be dedicated to GDDR, thereby reducing hardware cost for customers. The system and methods disclosed herein relate to an improved hardware configuration for geographically dispersed data restart ("GDDR") systems. Specifically, the teachings herein allow users to reduce the number of operating systems required to run multiple GDDR systems simultaneously by employing multitenancy principles in the system design. The embodiments cover a system for operating multiple GDDR complexes wherein the individual control systems typically required to run each GDDR complex are combined into a single logical partition. We also disclose methods and computer executable products for operating multiple GDDR complexes wherein the individual control systems typically required to run each GDDR complex are combined into a single logical partition.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIB. 2B is a functional block diagram of an exemplary data recovery system for providing data redundancy between two disparately located data centers having a synchronous connection therebetween.

Figure 2A:
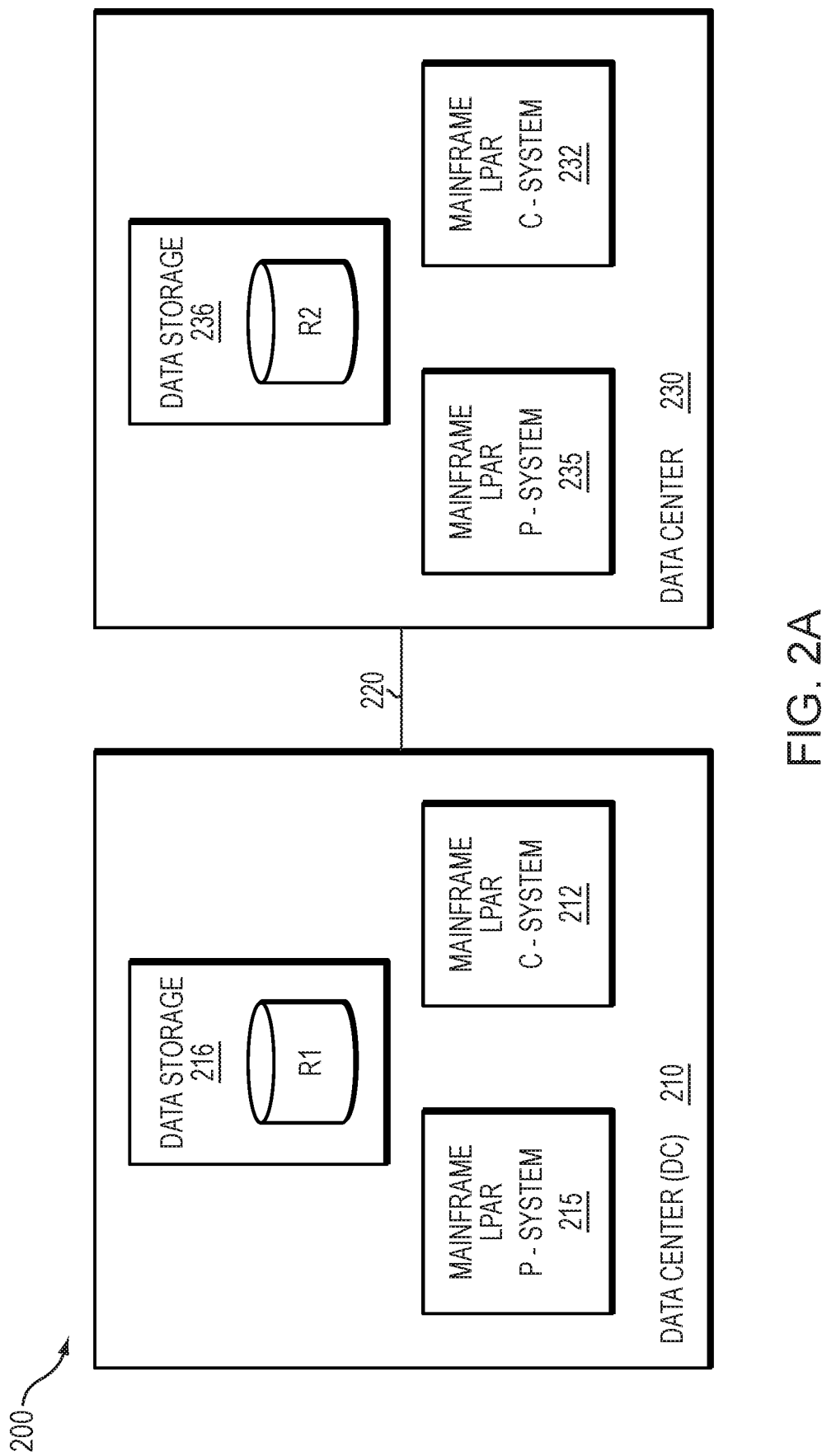
FIG. 2A is a functional block diagram of an exemplary data recovery system for providing data redundancy between two disparately located data centers.
Figure 2B:
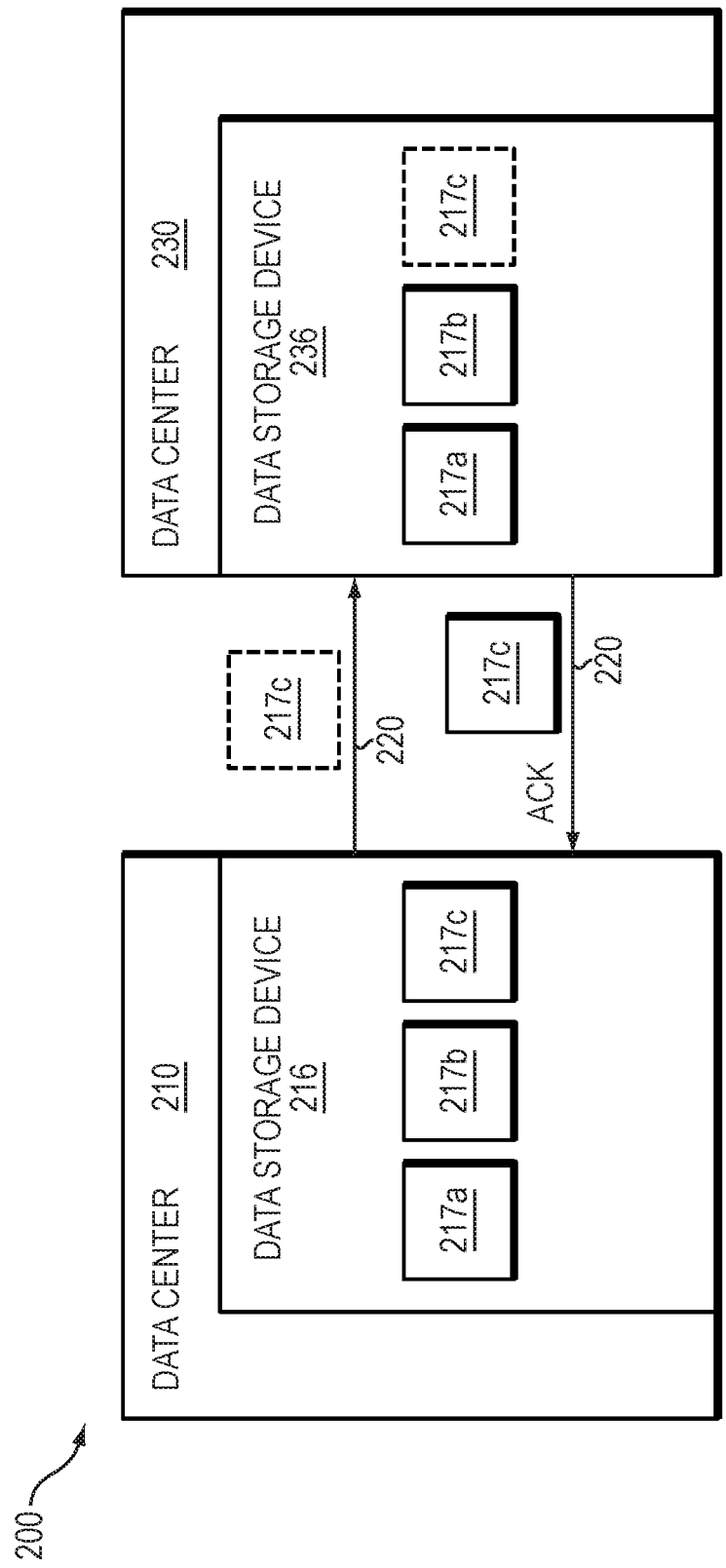
Figure 2C:
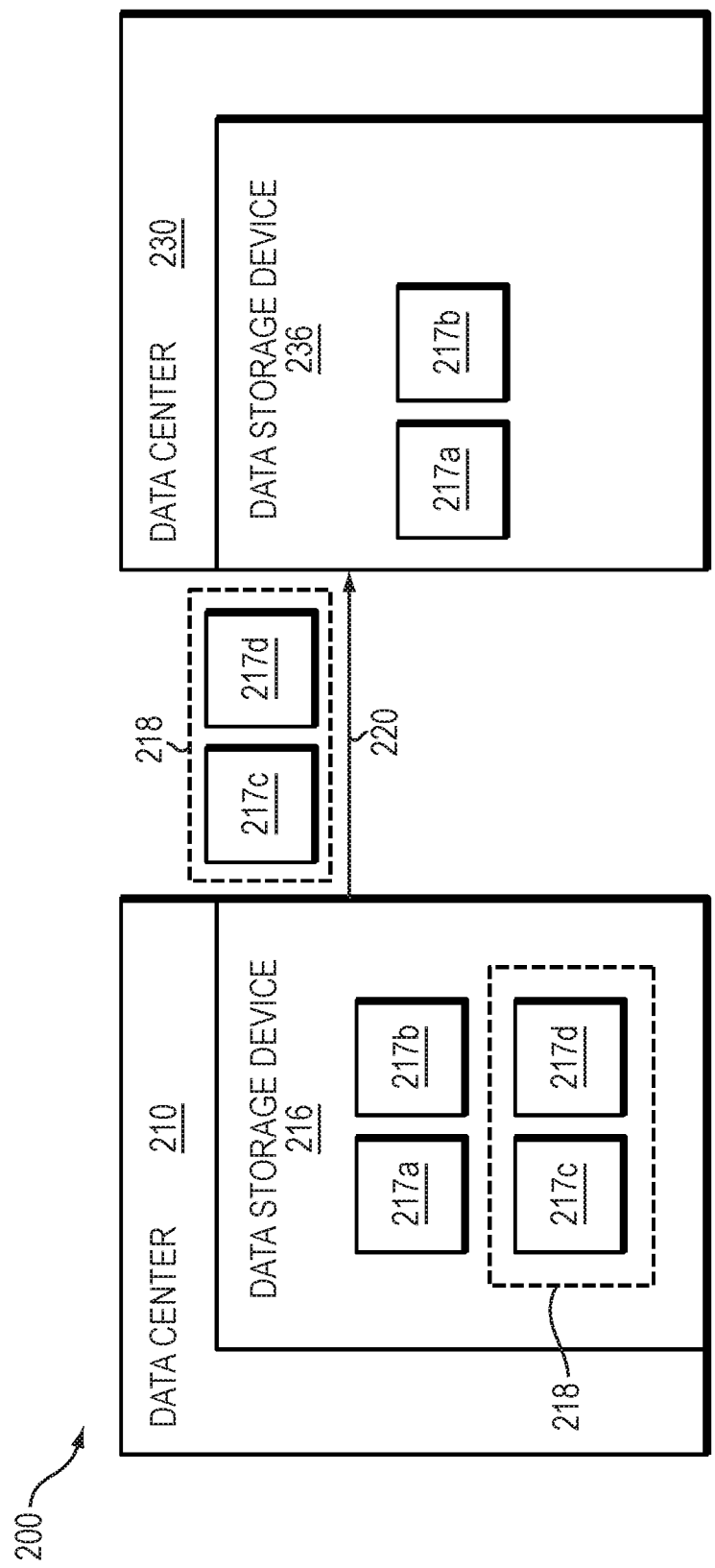

FIG. 2C is a functional block diagram of an exemplary data recovery system for providing data redundancy between two disparately located data centers having an asynchronous connection therebetween.

Figure 3A:
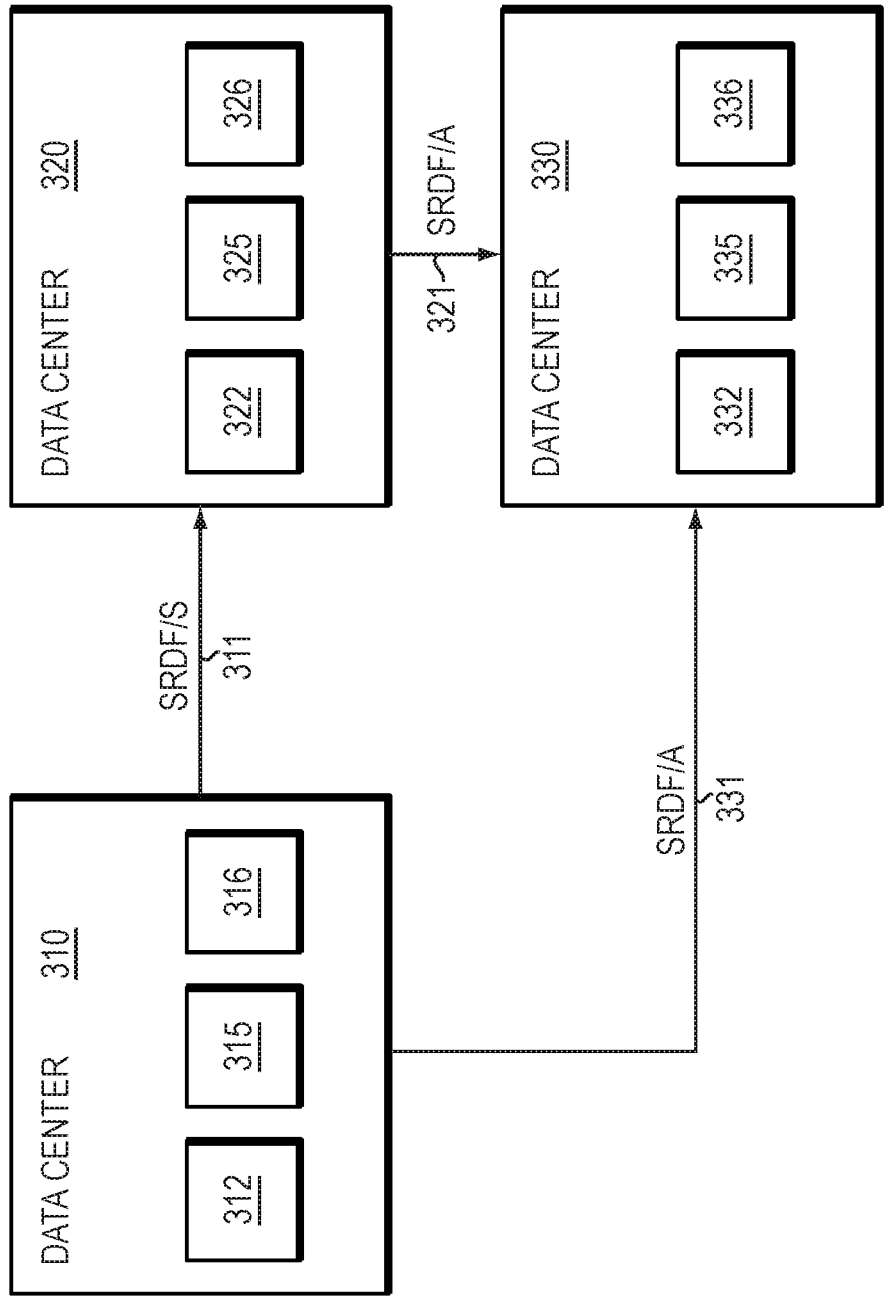

FIG. 3A is a functional block diagram of an exemplary topology of data centers using GDDR data redundancy according to teachings disclosed herein.

Figure 3B:
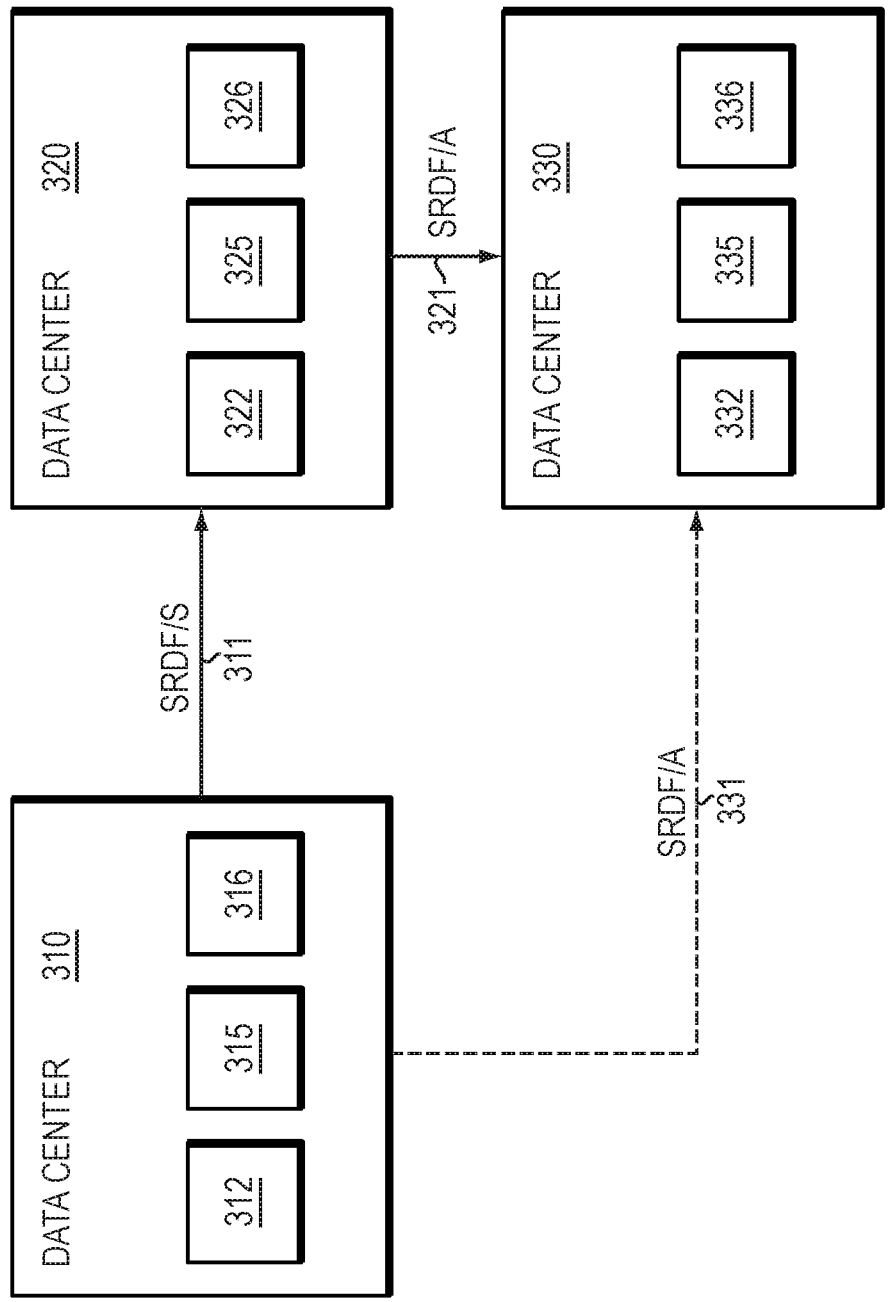

FIG. 3B is a functional block diagram of an exemplary topology of data centers using GDDR data redundancy according to teachings disclosed herein.

Figure 3C:
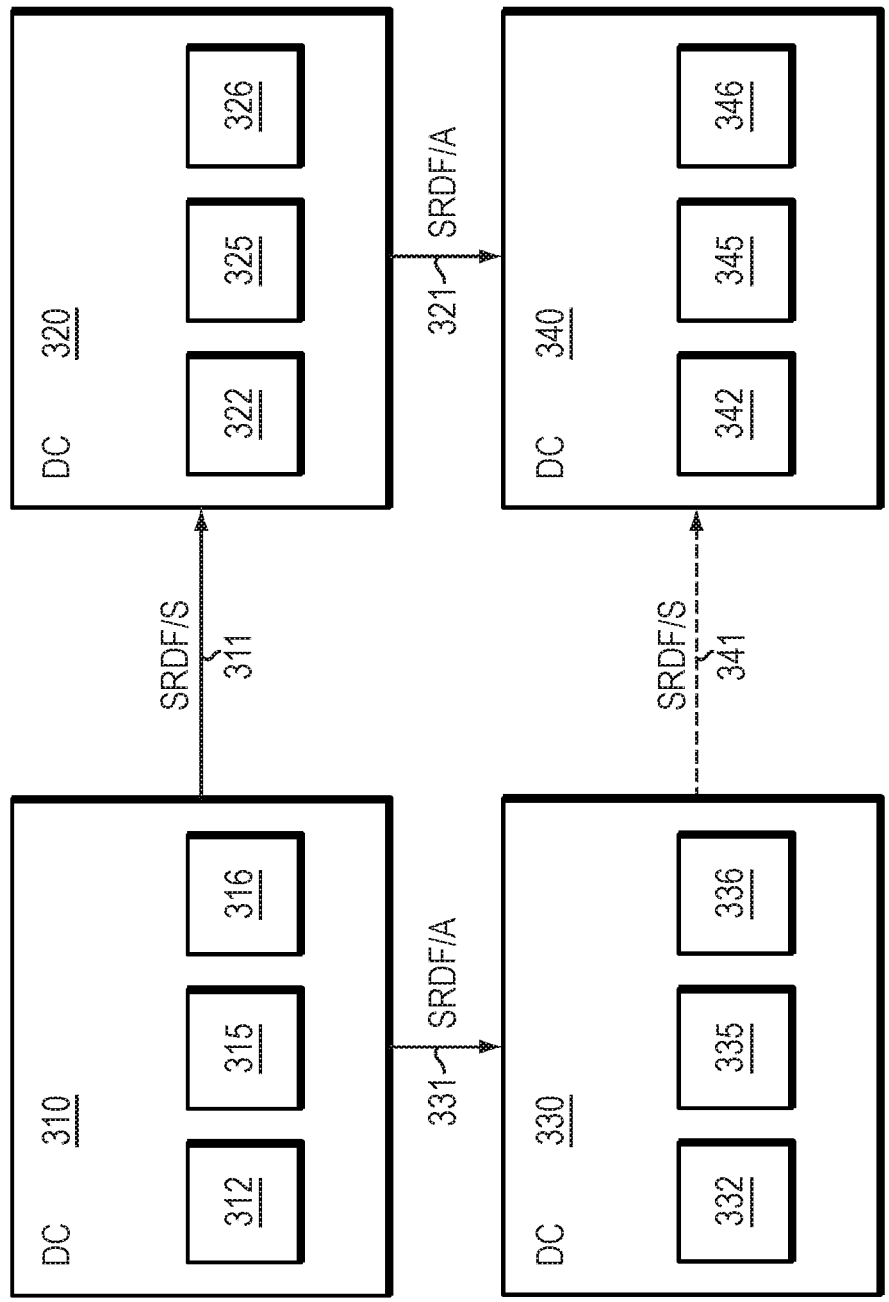

FIG. 3C is a functional block diagram of an exemplary topology of data centers using GDDR data redundancy according to teachings disclosed herein.

Figure 4:
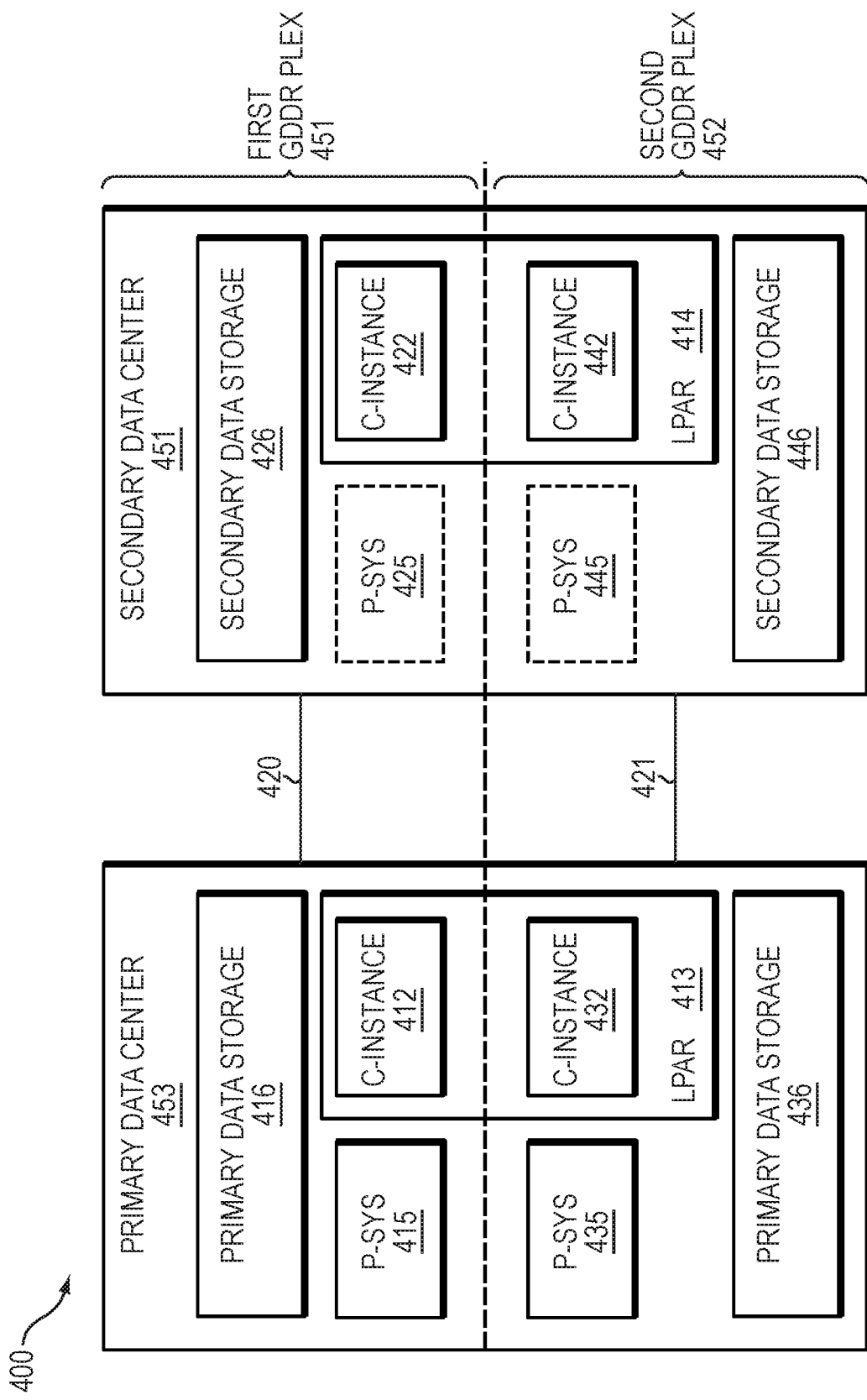

FIG. 4 is a functional block diagram of a geographically dispersed disaster restart ("GDDR") multitenancy system according to embodiments.

Figure 5:
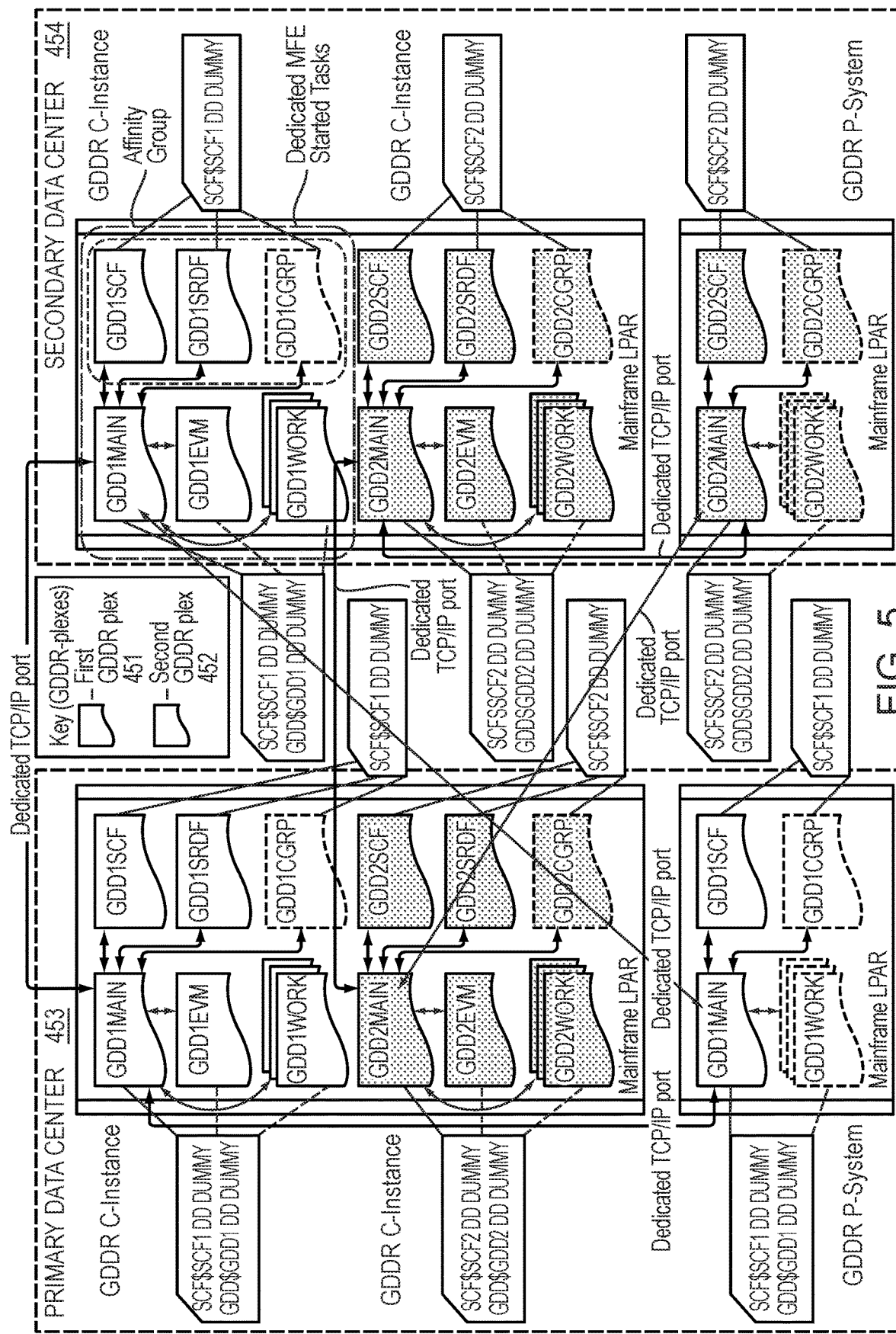

FIG. 5 is functional block diagram of two GDDR complexes sharing the same set of C-systems.

Figure 6:
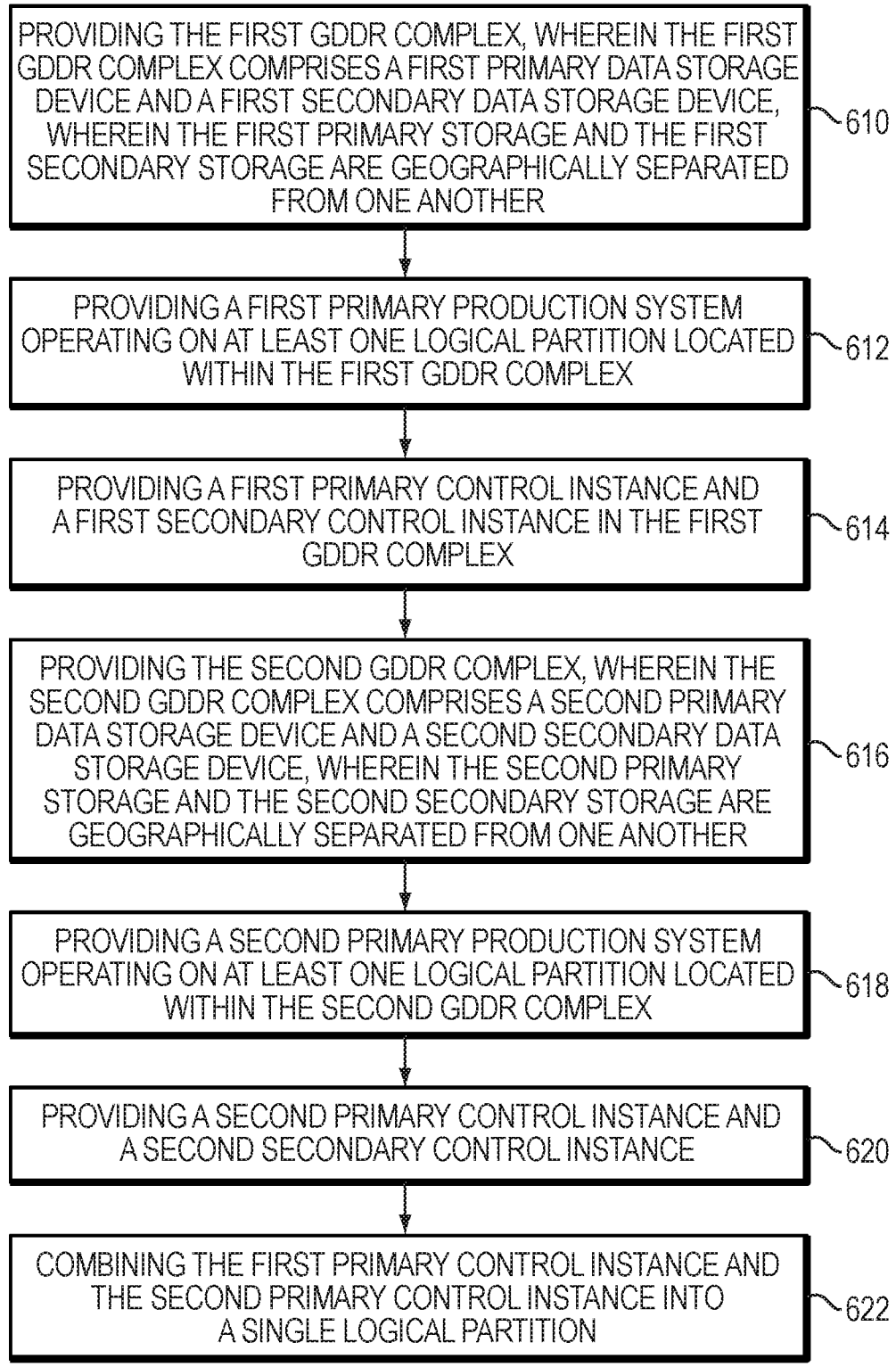

FIG. 6 is a flow chart of method steps according to embodiments disclosed herein.

GLOSSARY OF TERMS

The following terms have the following meanings as used within the specification and claims.

Affinity group refers to the combination of a C-instance and its set of dedicated mainframe enabler ("MFE") started tasks (e.g., SCF, SRDF Host Component, ConGroup).

C-instance refers to the combination of a single GDDR-MAIN address space and its dependent address spaces (e.g., GDDREVM, GDDRWORK, GDDR scripts) running on a given C-system, also called an LPAR.

Consistency group ("Con-group") refers to Dell EMC MFE software protecting data-consistency in a single GDDR complex, over a synchronous connection.

GDDR complex means a set of C-instances (one per site), and their managed production systems ("P-systems"), connected in some embodiments via TCP/IP, managing a single storage configuration.

GDDR connector means DD (data definition) whose name is in the format GDD$xxxx, where xxxx is the GDDR subsystem name. A GDDR connector is what ties GDDR address spaces together. The presence of this DD in the JCL connects a particular address space to the named GDDR instance.

Mainframe enablers ("MFE") means a suite of DELL EMC Mainframe software including ResourcePak Base (aka Symmetrix Control Facility or SCF), and SRDF Host Component, with optional components such as ConGroup, AutoSwap, MSC, TimeFinder and zDP Message affinity means the mechanism that keeps different GDDR-complexes fully isolated from each other and prevents a C-instance from reacting to messages that do not belong to it, either by processing them locally or by forwarding them to another system in the GDDR-complex. Message affinity also prevents a C-instance from reacting to messages issued by any MFE started tasks running outside of a GDDR-managed configuration.

[xxxx] Multi-session Consistency (MSC) refers to Dell EMC MFE software protecting data-consistency in a single GDDR complex, over an asynchronous connection.

P-system is an abbreviation for "production system." It means a z/OS system which is defined to GDDR to be a "GDDR-managed system" so that the C-systems can take planned and unplanned restart and recovery actions against that system. A p-system runs at a GDDR site, and is managed by the GDDR C-systems in the same GDDR complex. It drives JO requests to the storage systems managed by the GDDR C-systems. DELL EMC recommends having a GDDR presence (i.e., GDDRMAIN and dependent subtasks) on P-systems.

Symmetrix control facility (SCF") connector means DD (data definition) whose name is in the format SCF$xxxx, where xxxx is the SCF subsystem name. An SCF connector is what ties Dell EMC mainframe address spaces together. The presence of this DD in the JCL connects a particular address space to the named SCF instance.

DETAILED DESCRIPTION

In the data protection/data recovery field, there are many products designed to provide redundant data storage designed for business resiliency. One such solution, Dell EMC's Geographically Dispersed Disaster Restart ("GDDR") architecture, is an illustrative platform for discussing embodiments of the present system and methods designed to enhance the performance of data redundancy systems by reducing the required amount of dedicated hardware. Those of skill in the art will recognize the applicability of the teachings discussed herein to other architectural data redundancy platforms.

Figure 1:
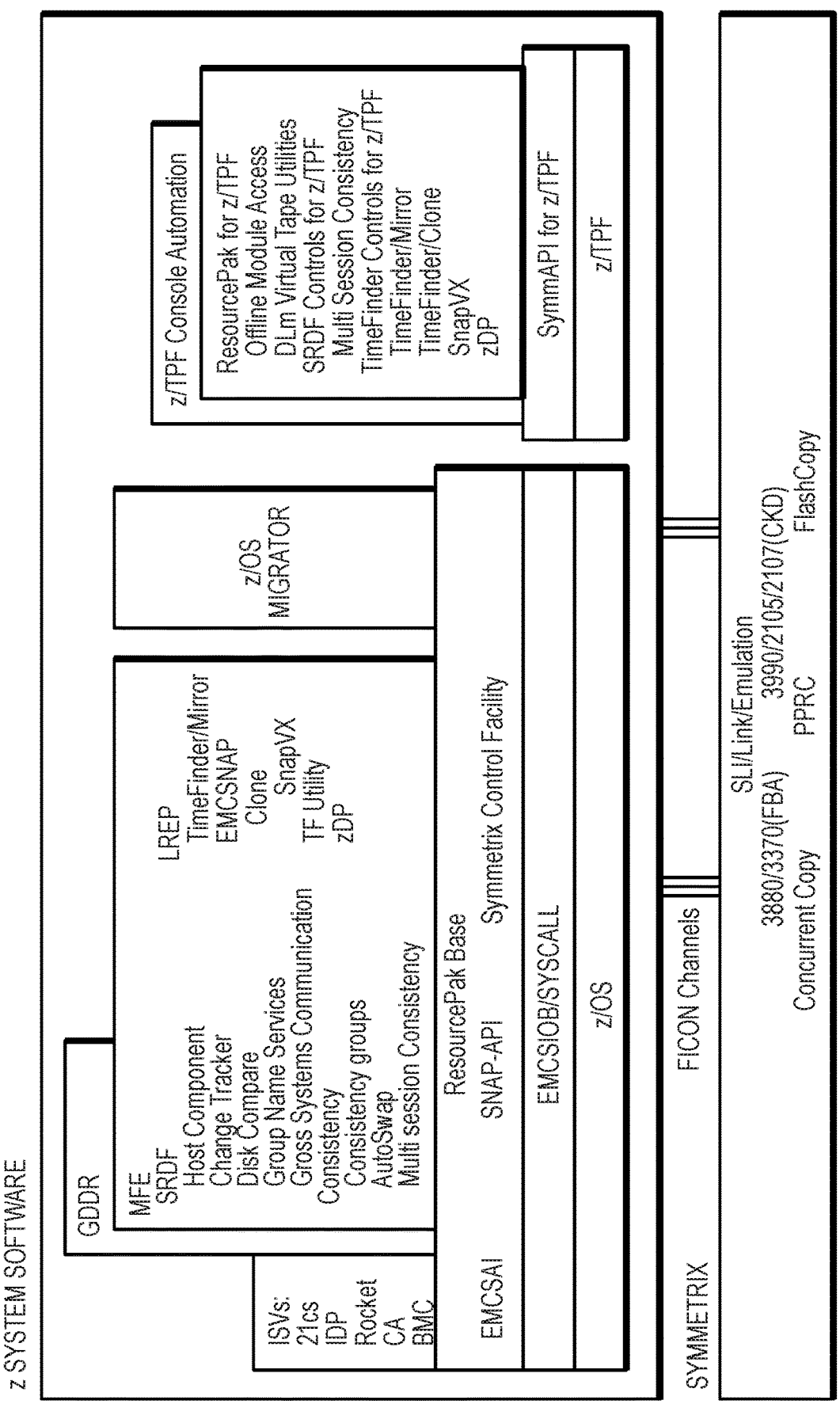
FIG. 1 is a software stack diagram showing integration points between Dell EMC mainframe software for z/OS and z/TPF operating systems.

FIG. 1 shows a mainframe software stack diagram depicting integration points between DELL ELMC Mainframe Software for the z/OS and z/TPF operating systems. The software stack covers both the base API layer, as well as the higher-level software offerings. Each of these elements is discussed below, starting with the Enginuity Core Services at the bottom of FIG. 1.

Hardware and Enginuity

Enginuity Core Services—This layer provides all DELL EMC Symmetrix VMAX feature functionality, like FAST, SRP(s), SRDF, LREP (including SnapVX), ECA, Host Communication Scratch Area.

SLI/Link/Emulation—This layer provides device and control unit type emulation for mainframe "MF" hosts, as well as emulation for IBM software features such as Concurrent Copy, PPRC (IBM's remote replication solution) and Flashcopy (IBM's LREP solution). FICON Channels— these are essential both for the MF Host to be able to perform basic IO operations to Symmetrix, as well for carrying the various syscalls from management software.

Above the Ficon Channels element, the diagram bifurcates into a z/OS and a z/TPF path, each path is discussed below.

z/OS z/OS—The z/OS operating system is the current evolution of IBMs MVS operating system, which has been around for decades. The z/OS operating system allows definition of an I/O configuration both at the MF Hardware level and the operating system software level so that the control units and devices presented by Symmetrix VMAX become addressable by application programs running on top of z/OS. At the software level, individual Symmetrix devices become available as an MVS-address a/k/a "sub-channels." MVS-addresses are 5-digit hex numbers, consisting of a 4-digit device number prefixed by a sub-channel-set indicator. MVS-addresses can be varied ONLINE or OFFLINE to the host using an MVS-command. OFFLINE devices are not available for regular IO, but still allow syscall IO. DELL EMC Gatekeepers in the Mainframe world are represented by an OFFLINE MVS-address. With the exception of the Starfire GK which is must be ONLINE. Mainframe IO is performed through the creation of a Channel Program, which is a series of one or more Channel Command Words (CCW) executed using a STARTIO (low-level) or Execute Channel Program (EXCP, higher level) instruction.

EMCSIOB/SYSCALL—The SYSCALL layer is implemented by attaching a syscall specific payload to one of a few special CCWs (e.g. Perform Subsystem Function and Define Special Operation).

ResourcePak Base—ResourcePak Base software provides the MF Management Software foundation layers to all applications that interact with Symmetrix. It also provides Licensed Feature Control which is used by GDDR. FIG. 1 shows Symmetrix Control Facility (SCF) as the heart of the ResourcePak Base software. SCF runs as a persistent address space and subsystem on z/OS hosts. It provides a uniform interface for EMC and ISV software products, where all products are using the same interface at the same feature/function level. ResourcePak Base is the delivery mechanism for the EMC Symmetrix Applications Programming Interface for z/OS (SymmAPI-MF), as well as the SNAP-API and Swap Services. It provides a central point of control by giving software a persistent address space on the mainframe for VMAX functions, performing tasks such as the following:

Maintaining an active repository of information about VMAX devices attached to z/OS environments and making that information available to other EMC or ISV-provided products;

Performing automation functions;

Facilitating inter-LPAR communication through the VMAX storage system. (The Cross Systems Communication feature shown higher-up in the diagram is an SCF function);

Facilitating inter-program communication through a persistent address space on the host; and Insulating host applications from differences in the Enginuity/HYPERMAX OS operating environment of the VMAX system at different release levels.

ISVs—ISVs are shown top-right in the diagram, and use the documented EMCSAI interface for development of their MF Management software packages.

z/OS Migrator—DELL EMC z/OS Migrator is a host-based data migration facility that migrates data from any vendor's storage array to a VMAX system without application downtime or disruption to business-continuity readiness. It can also be used to migrate data from one VMAX system to another. The migration can be done at either the volume or the dataset level. EMC z/OS Migrator performs traditional volume migrations as well as host-based volume mirroring. Together, these capabilities are referred to as the Volume Mirror and Volume Migrator functions of z/OS Migrator. In addition, z/OS Migrator can also migrate active mainframe datasets at the logical dataset (extent) level from one set of volumes to another, without any application downtime. This capability is referred to as logical migration, and z/OS Migrator can perform this migration in a non-disruptive manner to applications and business continuity.

MFE—The Mainframe Enablers suite of software products sits squarely in the middle of FIG. 1. The Mainframe Enablers suite of software, discussed in three parts below, is one integrated software suite.

MFE Part 1—SRDF Related Infrastructure and Support Software

SRDF HC—SRDF Host Component is supporting tool used to Query and Manage an SRDF configuration. It provides a wide array of query types, showing detailed device-type and device-attribute information, as well as rdf-group level and Symmetrix level information. It allows the user to control synchronous, asynchronous and ADCOPY-DISK remote replication, with extensive command validation, both from the syntax and the object status perspective. SRDF HC also plays an important role in the definition of Multi-Session-Consistency (MSC) groups.

ChangeTracker—The ChangeTracker utility allows users to monitor activity on VMAX devices. ChangeTracker enables determination of the number of tracks that have been accessed during the interval since the last monitoring. Having accurate track change information is important when sizing SRDF connectivity requirements. Users typically must know the speed and number of connections required from service providers for an effective SRDF implementation. ChangeTracker helps determine this important information. Having accurate track change information is also important in determining resynchronization times. Users can track changes to help set the time needed for various synchronizing and resynchronizing activities.

ChangeTracker consists of two components, namely, ChangeTracker Collector, which gathers statistics, and ChangeTracker Reporter, which analyzes the data and formats it into useful reports. In addition, ChangeTracker Reporter can assist in configuring SRDF environment by calculating one of the three calculated parameters: (1) number of remote adapters, (2) communication speed, and (3) resynchronization time, based on the values of the other two parameters.

Disk Compare—The Disk Compare utility compares tracks on pairs of logical disk volumes at the physical level. The utility supports comparison of devices that are multiple hops away in an SRDF configuration. When using Disk Compare, users can compare multiple devices at the same time. In addition, they can analyze all tracks up to 32 pairs of logical disk volumes at the same time. Moreover, users can refine the scope of comparison by specifying the number of cylinders desired for comparison, including the cylinder skip count.

Disk Compare reports all miss-compares and errors on a pair of volumes until it has detected a preset number of miss-compared tracks. At that point, Disk Compare terminates. If users are comparing multiple pairs of devices, and any device pair fails, the remaining device pairs continue to be processed. Disk Compare is able to perform remote comparisons in SRDF configurations that include two or three VMAX systems, which allows users to verify the data integrity of the primary (R1) and secondary (R2) device.

Cross Systems Communication (CSC)—CSC is provided through ResourcePak Base and controls inter-LPAR communications. CSC uses locally and remotely connected VMAX systems to facilitate communications between LPARs, across sysplex boundaries. A number of EMC VMAX mainframe applications (e.g. ConGroup, AutoSwap) use CSC to handle inter-LPAR communications.

Group Name Services—GNS (Group Name Services) is the VMAX group definition sharing facility. GNS allows users to define a group once, in one place, and then use that single definition across multiple Dell EMC products on multiple platforms. Users can use group definitions created through GNS on a mainframe system with Dell EMC software products running on open systems hosts. GNS also allows users to define group names for volumes that can then be operated upon by various other commands. Each group is a collection of VMAX system and the devices that reside on those systems. For groups that span multiple systems, the definition is stored as a set of components on different VMAX systems, each of which holds its portion of the definition. GNS groups on the Mainframe are manipulated using SCF commands or using a batch utility.

MFE Part 2—SRDF Consistency Management Software

Consistency Groups (CG)—EMC Consistency Groups (ConGroup) is designed to protect and maintain consistency of remotely mirrored data in an SRDF/S configuration. ConGroup supports all valid SRDF topologies, including Concurrent and Switched SRDF.

ConGroup relies on the host application to implement dependent write logic. Dependent write logic means that an attempt by an application to issue a given I/O request depends on the prior successful completion of another I/O operation. ConGroup further relies on the Symmetrix SRDF-ECA feature to prevent write completion in case the update cannot be propagated to the R2. The event whereby a Write JO fails to replicate to the R2, and the subsequent suspension of all synchronous SRDF replication for devices included in the protected group, is called a ConGroup Trip. ConGroup thus ensures a consistent restartable image of the data exists on the synchronous R2 target devices.

ConGroup uses the Cross System Communication (CSC) component of ResourcePak Base to coordinate ConGroup state changes across multiple z/OS images in a shared DASD or parallel sysplex environment, in what is called a CSC Multi-mode network. Because ConGroup uses SCF, the ConGroup multi-mode network can span multiple LPARs, within or outside parallel sysplexes, multiplexes, or combinations of these.

AutoSwap a/k/a ConGroup AutoSwap Extension (CAX)—AutoSwap can move (swap) workloads from volumes in one set of VMAX systems to volumes in other VMAX systems without interruption of operations. Swaps can be initiated manually as planned events or automatically as unplanned events upon failure detection. AutoSwap can be used in both shared and non-shared DASD environments. AutoSwap uses standard z/OS operating system services to ensure serialization and to affect swaps. AutoSwap uses the Cross System Communication (CSC) component of ResourcePak Base to coordinate swaps across multiple z/OS images in a shared DASD or parallel sysplex environment. Because AutoSwap uses SCF, the AutoSwap consistency environment can span multiple LPARs, within or outside parallel sysplexes, multiplexes, or combinations of these. AutoSwap is tightly integrated with ConGroup, so that a ConGroup Trip will preclude any subsequent Swap, and a Swap disables ConGroup.

Multi-Session Consistency (MSC)—MSC (Multi-Session Consistency) is an environment in SCF that ensures remote R2 consistency across multiple VMAX systems running SRDF/A. It provides coordination of SRDF/A cycle switches across systems. SRDF/A sessions can be grouped together as a single entity called an MSC group. The MSC group is defined through SRDF Host Component. A system running MSC software is referred to as an MSC server. MSC can be configured with a Primary MSC Server and one or more Secondary MSC Servers. Secondary MSC servers can automatically take on the SRDF/A cycle switch co-ordination should the Primary MSC server fail. MSC can be active in a 2-Site configuration controlling just the SRDF/A cycle switching, or it can be part of a larger configuration as discussed below SRDF/Star—In an SRDF/Star configuration, which consists of SRDF/S replication for one pair of sites, Concurrent or Cascaded with asynchronous replication to a third site, MSC software is integrated with ConGroup (and optionally AutoSwap software) and performs not only the SRDF/A cycle switch coordination, but also the SDDF session management required to provide the differential resynchronization between the recovery sites should the source site (or in the Cascaded case, the synchronous target site) be lost. In case replication on the synchronous connection is interrupted, MSC will export an indication that the long distance remote site has the most recent data. SRDF/Star can be configured with a Primary MSC Server and a Secondary MSC Server. An MSC,TAKEOVER command is provided to allow a Secondary MSC server to take over not only the SRDF/A cycle switch co-ordination, but also the integration with ConGroup and the SDDF session Management. SRDF/Star is supported with GDDR.

SRDF/SQAR—the SRDF/SQAR configuration provides consistent replication on the edges of a square (4-site) configuration. The 4 sites in this configuration are grouped with 2 sites at short distance from each other, located in 2 regions at long distance from each other. In this configuration, MSC controls 2 independent MSC groups, one on each long distance connection, and is integrated with AutoSwap software on the short distance connection. MSC again provides SRDF/A cycle switch co-ordination, and SDDF session management at the recovery sites in the remote region. In embodiments, SRDF/SQAR is configured with a Primary and a Secondary MSC Server, providing similar functionality as described for SRDF/Star. In alternate embodiments, SRDF/SQAR is supported with GDDR.

SRDF/Star-A—The SRDF/Star-A configuration is comprised of 3 sites, all at long distance from each other, with Concurrent SRDF/A from one source site to two target sites, and differential resynchronization between the two target sites, should the source site be lost. In this configuration MSC again controls SRDF/A cycle switching for two independent MSC groups, one for each long distance connection from the source site, and performs SDDF session management at the target sites.

MFE Part 3—TimeFinder Related Software (LREP)

TF/Mirror—full space volume copies—In the past, TF/Mirror target devices acted as a true local mirror of the source device. Since the introduction of VMAX, all TF/Mirror commands, although still syntactically supported, are converted by the EMCTF program to TF/Clone commands. TF/Mirror supports differential operations after an initial full copy has been performed. TF/Mirror has ESTABLISH/RESTORE to cause the copying of the data, and SPLIT commands to stop the data copy and allow the target devices to be made accessible to the host.

TF/Mirror supports creation of consistent copies, across any number of devices, across any number of Symmetrixes, provided the source devices are in a state allowing creation of a consistent copy. To achieve this, EMCTF provides a sequence-level, as a sort of tag on each SPLIT command, and will attempt to create a consistent image across all devices with SPLIT commands at the same sequence level, when requested. TF/Mirror requires the target devices to have the legacy 'WV' flag.

TF/Clone Mainframe SNAP facility—full space volume or dataset copies—TF/Clone allows copying any device to any device, and also allows the user to only copy one or more datasets from one volume to another, instead of copying the entire volume (SNAP DATASET). Furthermore, TF/Clone can make the target volume available immediately, before the data has been copied. TF/Clone provides the SNAP and ACTIVATE commands. ACTIVATE applies to all previous SNAP commands in the input stream, and can provide a consistent data copy under same circumstances as TF/Mirror.

TF/SnapVX—space efficient volume copies. TF/SnapVX was introduced with the VMAX3 generation of HW, and provides data copies called snapshots, which only take the place required to hold tracks updated on the source volumes since the time of activation of the snapshot. TF/SnapVX creates snapshots of the data, not requiring target devices at all. Data can be restored, straight from the snapshot back to the source device. Consistent snaps are supported. Up to 256 snapshots can be created from the same source device. Target devices, while not required, are supported, and up to 1024 target devices can be linked to the same source device. This can be 1024 targets linked to a single snapshot, or 4 targets for each of 256 snapshots, or anything in between.

TF/Utility—making local copies of your data available to z/OS—DELL EMC LREP technology creates copies for volumes, but to make the data on these copies fully useable on the system which is the source of the data, additional processing is required, and this is what TF/Utility does. TF/Utility makes data copies available in parallel to the source data on the same z/OS system. Users making complete copies of all data required for a system and its applications to run, can bring up another z/OS system from the copies, without the need for TF/Utility. TF/Utility is typically used by users of TF/Mirror and TF/Clone Mainframe Snap facility. With TimeFinder Utility, users can relabel devices with new volsers and update the catalogs by renaming and recataloging both VSAM and non-VSAM datasets. TimeFinder Utility enables users to perform the following operations in a production or simulation run: (1) assign a different volser to a device CUU; (2) mass change the HLQs (high-level qualifiers) of datasets; and (3) recatalog the datasets to an existing or a new catalog zDP—z/OS Data Protector—a/k/a the "Time Machine" for mainframe. Data Protector for z Systems (zDP) delivers the capability to recover from logical data corruption with minimal data loss. zDP achieves this by providing multiple, frequent, consistent point-in-time copies of data in an automated fashion from which an application level recovery can be conducted, or the environment restored to a point prior to the logical corruption. By providing easy access to multiple different point-in-time copies of data (with a granularity of minutes), precise remediation of logical data corruption can be performed using application-based recovery procedures at the dataset level. zDP results in minimal data loss compared to the previous method of restoring data from daily or weekly backups. This is important for non-DBMS data, which does not have the granular recovery options provided by log files and image copies associated with database management systems. zDP enables users to create and manage multiple point-in-time snapshots of volumes. A snapshot is a pointer-based, point-in-time image of a single volume. These point-in-time copies are created using the SnapVX feature of HYPERMAX OS.

GDDR—Geographically Dispersed Disaster Recovery Automation—GDDR provides automation for real Disaster Recovery and Business Continuity requirements as well as DR-Test scenarios for VMAX (used both as DASD and as TAPE backend storage) as well as VNX and DD (used as TAPE backend storage), exploiting both local and remote replication features to achieve the highest data protection and availability. It provides monitoring of a user-defined configuration, and integration points with customer automation to speed up recovery.

Standardization and Customization—GDDR is characterized as a highly standardized yet highly customizable solution. A single common code base brings a familiar look and feel and a consistent framework to the multiple configuration types it supports. A well-structured and standardized process to perform configuration definition enables highly dynamic configuration management. Configuration definition is further facilitated by automatic configuration discovery. GDDR offers several screens full of options to control its behavior during scripts.

Configuration support—GDDR Supports Mainframe (DASD and TAPE) as well as Distributed servers (DASD) in a single Enterprise Consistency group, in multiple variations of 2-Site, 3-site and 4-site configurations. It provides management capabilities for the local and remote replication and data consistency features provided by VMAX using a standardized EMC Symmetrix API as well as a command interface, but also for Mainframe LPARs using BCPii and for Mainframe Tape where VMAX serves as the backend storage, using the DLMDR interface. The integration with DLm allows coordinated planned and unplanned site swaps as well as DR-Testing for DASD and Tape at the same time. GDDR supports all these configurations out of the box with all required scripts to perform unplanned as well as regular planned Site Swaps as well as SRDF resumption operations and both in-region and out-of-region DR testing.

LREP support—GDDR supports TF/Mirror, TF/Clone and TF/SnapVX and provides seamless integration with zDP by ensuring that zDP operations are temporarily paused during GDDR scripts at affected sites, thus avoiding creation of needless copies at times when the data does not change. zDP activity is automatically resumed by GDDR at the end of affected scripts. GDDR supports the creation of consistent images of the data across V1/V2 and V3 Symmetrix VMAX HW. GDDR supports usage of a dedicated TEST-set of LREP targets, on top of a GOLD set used to preserve data consistency at a site during SRDF resynchronizations.

TAPE support—In GDDR 5.1 the common GDDR code base has been enhanced to support an additional licensed feature called GDDR TAPE. GDDR TAPE brings the familiar GDDR automation framework to the Disaster Recovery of Mainframe TAPE data where VNX and/or Data Domain servers form the backend storage. Just like for VMAX, GDDR TAPE provides scripting for unplanned as well as planned site swaps and DR-Test scenarios. GDDR Tape allows operations with very fine granularity, as it can run scripts on subsets of the data, as small as a single Tape Library and even pools within Tape Libraries. GDDR TAPE is supported in 2-site configurations only. When combined with a GDDR (VMAX) license, coordinated VMAX-VNX/DD scripts are possible.

z/TPF z/TPF—The Transaction Processing Facility (z/TPF) system is an operating system that works with application programs to process transactions for customers in a real time environment. The z/TPF system is designed for businesses and organizations that have high online transaction volumes and large networks. Because of its high capacity and high availability characteristics, the z/TPF system is well suited for environments where growth is expected to be very fast or unpredictable, or where there are high peak periods of transaction activity. It is especially useful for applications that need high capacity and extremely low cost per transaction.

z/TPF is an extremely responsive solution to the problem of keeping track of a large number of transactions. Originally developed for the airline industry, it is also used for banking networks, credit card companies, railways, hotel chains, car rental agencies, insurance companies and police departments. The common link between the diverse applications is that they all require large numbers of terminals to be connected to a common database, and the response time to requests or commands to be "immediate".

The z/TPF system has the following advantages and characteristics: it may be accessed by tens of thousands of terminals, from many locations around the world, information is stored in a large centralized database that may be as large as tens of thousands of megabytes, the system is available 24 hours a day, every day of the year; the scheduled availability exceeds 99.9% and when z/TPF central processing complexes (CPC's) are run in a loosely coupled configuration even higher availability can be achieved, it is a real-time inquiry-response system with high message rates which means: "up to hundreds of messages per second; and for even higher throughput, a loosely coupled z/TPF system can process thousands of messages per second". To run in a loosely coupled environment the storage subsystem must support the Multi Processor Lock Facility (MPLF).

z/TPF Mainframe JO is performed thru the creation of a Channel Program, which is a series of one or more Channel Command Words (CCW), which is executed using a STARTIO (low-level) or Execute Channel Program (EXCP, higher level) instruction.

SymmAPI for z/TPF—The SYSCALL layer is implemented by attaching a syscall specific payload to one of a few special CCWs (e.g. Perform Subsystem Function and Define Special Operation).

SRDF Controls for z/TPF—Is used to configure, display, and manage your remote replication (SRDF) configurations. It provides a wide array of display types, showing detailed device-type and device-attribute information, as well as RDFGroup level and Symmetrix level information. It allows the user to control synchronous, asynchronous and adaptive copy disk remote replication, with extensive command validation, both from the syntax and the object status perspective. SRDF Controls for z/TPF is also used to configure, display, and manage Multi-Session-Consistency (MSC) groups. Please see descriptions of z/OS MFE level features for information about MSC.

TimeFinder Controls for z/TPF—Is used to configure, display, and manage your local replication (TimeFinder) configurations. It provides a wide array of display types, showing detailed device-type and device-attribute information, as well Symmetrix level information. It allows the user to control TimeFinder/Mirror Emulation, TimeFinder/Clone Emulation, SnapVX, and zDP groups. Please see descriptions of z/OS MFE level features for information about these various local replication features.

ResourcePak for z/TPF—Provides various utilities and features (E.G. QoS, Cache Partitioning, MPLF Lock and Attention Message Display) that can be used separately or in conjunction with SRDF and TimeFinder Controls for z/TPF.

Offline Module Access (OMA) provides a customer API for the customer to develop utilities to display and/or restore individual records from a clone or linked snapshot to the production z/TPF database.

DL/m virtual tape utilities provide a suite of functionality required to use DL/m in a z/TPF environment.

Console Automation—Customers typically develop Console Automation using scripted procedures and processes provided by z/TPF Engineering. This console automation is the highest level of software used to manage SRDF and TimeFinder Groups for a z/TPF Disaster Recovery solution.

FIG. 2A shows exemplary architecture for a two-site data recovery system 200. This two-site data recovery system 200 comprises, a first data center 210, which is also referred to as a primary data center, having a control system 212, a production system 215, and a data storage device 217. Similarly, the secondary data center 230, also contains a control system 232, a production system 235, and a data storage device 237. By way of example, and without limitation, the two-site data recovery system could be a GDDR mainframe system operating on an IBM mainframe platform. While embodiments herein will be discussed with reference to GDDR architectures running on IBM mainframes, those of skill in the art will recognize that the systems and methods disclosed herein could also be implemented on other data/disaster recovery architectures operating on different mainframe platforms.

The first 210 and second data centers 230 are communicatively coupled via communication link 220. Communication link 220 can provide both synchronous, SRDF/S, and asynchronous, SRDF/A, data redundancy between first data center 110 and second data center 230. FIG. 2B depicts a synchronous data connection between data centers 210 and 230. In typical embodiments, synchronous connections are used when data centers 210, 230 are located within close proximity to one another. Exemplary synchronous topologies could have data centers 210, 230 within the same building. Typical entities seeking to deploy synchronous data centers 210, 230 may be financial institutions and the like who must ensure that a check deposit recorded at data center 210 appears as a full check deposit, having all of the same information, at data center 230.

When a synchronous topology is used, the architecture and software within is designed to ensure that data storage devices 216, 236 are mirror images of one another. FIG. 2B depicts a high-level rendition of a synchronous topology used in embodiments. When GDDR systems employ a synchronous topology, all data storage devices are kept in synch in real-time. In order to depict synchronization, FIG. 2B shows a portion of data center 210 and data center 230.

Specifically, FIG. 2B shows data storage device 216, which in this example is the primary storage device. Data storage device 236 is a back-up storage device. Prior to data block 217c being written to data storage device 216, primary storage 216 and backup storage 236 are mirror images of one another. Once data block 217c is entered into data storage device 216, it is essential for the same data block 217c to be written to data storage device 236. After data block 217c has been stored within data storage device 236, data center 230 sends and acknowledgement message to data center 210. In embodiments, the acknowledgement message will be received within the control system 212 of data center 210.

In embodiments, data centers 210 and 230 are considered fully equivalent for strategic production applications. In some embodiments, communication link 220 can be a highly redundant direct network link. In additional embodiments, both open system FBA and mainframe CKD disk images can be replicated.

FIG. 2C depicts a high-level rendition of an asynchronous topology used in embodiments. In asynchronous topologies, data centers 210, 230 exhibit multi-cycle consistency, which ensures consistency at a coarser level than with synchronous data connections. In an asynchronous topology, data blocks 217a and 217b have both been committed to data storage devices 216 and 236. Data blocks 217c and 217d are then written to data center 216. Data center 210 is configured through its software, firmware and hardware to transmit additional data blocks written to it that have not yet been committed to data storage device 236 in batches 218.

In FIG. 2C, data center 210 is a primary data center, while data center 230 is a secondary data center. Data centers 210 and 230 are considered fully equivalent for strategic production applications. In this embodiment, communication link 220 can be a highly redundant direct network link. Additionally, both open system FBA and mainframe CKD disk images can be replicated. In embodiments, an SRDF/A environment can manage one Multi-Session Consistency Group ("MSC"). An MSC group is a named group, consisting of multiple remote data facilities ("RDF"), which is an abbreviation for Symmetrix Remote Data Facility ("SRDF") groups operating in an asynchronous, or SRDF/A, mode.

Data centers 210, 230 operating in an asynchronous mode do not have to be closely located. In fact, it is advantageous for these data centers to be meaningfully separated so that a single weather event, natural disaster, or human-made disaster does not destroy primary 210 and secondary 230 data centers.

One of the main purposes of the data recovery system 200 is to create data redundancy between the first 210 and second data centers 230. This is accomplished by ensuring that data blocks 217 in the first data storage device 216 mirror the data blocks 237 stored in the second data storage device 236. Generally speaking, data synchronization can be synchronous or asynchronous. Communication link 220 is provisioned to provide both types of a connection. In some embodiments, communication link 220 is provisioned to provide an SRDF/S connection. In alternate embodiments, communication link 220 is provisioned to provide an SRDF/A connection.

Production system 215 manages control system 212, while production system 235 manages control system 232. Although production systems 215, 235 are depicted as separate logical blocks, they could in some embodiments reside within a separate LPAR collocated with control system 212, 232, respectively. In current GDDR topologies, each data center 210, 230 configuration requires a separate mainframe partition to act as a control system 212, 232.

FIGS. 3A-3C depict alternate GDDR topologies, also called environments. These environments are exemplary and not intended to be limiting in terms of the types of connections between data centers, the number of data centers, and the hardware pictured within data centers.

FIG. 3A depicts a Concurrent SRDF/Star Environment having three data centers, 310, 320, 330, while FIG. 3B depicts a Cascade SRDF/Star Environment. In both FIG. 3A and FIG. 3B, each data center includes hardware similar to that described with regard to FIGS. 2A-2C. That is, data centers 310, 320, 330 contain control systems 312, 322, 332, production systems 315, 325, 335, and data storage devices 316, 326, 336. In alternate embodiments, the production systems 315, 325, 335 could be realized as logical partitions within their respective control systems 312, 322, 332.

In both of these environments, the communication between data center 310 and data center 320 is synchronous, as shown via SRDF/S designation at communication link 311. Additionally, the communication between data center 310 and data center 330 is asynchronous, as shown via SRDF/A designation at communication links 321 and 331. Dashed lines indicate backup communication links.

In FIGS. 3A and 3B, data center 310 is the primary site with concurrent replication to secondary site 320 and tertiary site 330. Data center 330 is the tertiary data center for critical production applications and data. Data center 330 is connected via redundant connections 321 and 331, which can be SRDF/A communication links. Data is replicated asynchronously from the primary data center 310 or secondary data center 320 to the tertiary data center 330. In embodiments, open system (FBA) and mainframe (CKD) disk images can be replicated. In alternate embodiments, there can be an auto-swap engine or module enabled within control system 312, 322, 332 or production system 315, 325, 335 configured to automatically switch designations of primary, secondary, or tertiary if the operation integrity of the primary site is compromised.

FIG. 3C depicts an SRDF/SQAR environment having four data centers, namely 310, 320, 330, AND 340. In this configuration, data center 310 is the primary data center. This configuration enables resynchronization between sites 310, 320, 330, 340 along the perimeter of a "square" multi-site topology. An objective for an SRDF/SQAR environment such as that shown in FIG. 3C is to meet the requirements of a multi-region, high availability and restart solution. The SRDF/SQAR configuration allows the data holder to recover from a single or dual, unplanned outage in one region. This is partly due to the local SRDF/S communication links 311 and 341. In some embodiments, this configuration could also employ an auto-swap engine or module.

As can be seen in FIG. 3C, there is a synchronous connection 311 between the primary data center 310 and the secondary data center 320. The primary data center 310 has an asynchronous connection 331 with the tertiary data center 330. The secondary data center 320 has an asynchronous connection 321 with the quaternary data center 340. And tertiary data center 330 has an asynchronous data connection 341 with the quaternary data center 340.

In alternate configurations, there could be a version of GDDR deployed known as GDDR Tape. GDDR Tape monitors Disk Library for mainframe (DLm) operations for DLm systems with either a VNX or DataDomain (DD) backend and automates DLm Disaster Recovery (DR) test and failover/failback processes. GDDR Tape utilizes the DLMAUT API to provide this automation. GDDR Tape main activities include: (1) Actively monitor the managed environment and respond to exception conditions; (2) Test disaster recovery from a snapshot at a remote site; and (3) Run planned and unplanned failover and failback operations. GDDR Tape is based on the EMC GDDR (Geographically Dispersed Disaster Restart) framework. GDDR Tape runs on the z/OS system ("managed LPAR") and requires no separate GDDR control system.

In the topologies discussed thus far, we have shown a single control system, or a dedicated LPAR within the unique control system, for each data center. For example, the two site architecture had control systems 212, 232 or LPARs 213, 214, 233, 234. As was stated earlier, a single LPAR 213, 233 in this architecture could be a control system 212, 232, which would allow the other LPAR to perform the functions of production system 215, 235. Similarly, in the three and four site topologies shown in FIGS. 3A-3C, each data center had an individual control system 312, 322, 332, 342, or at minimum a dedicated LPAR within the control system. These topologies are implemented today. It would be advantageous, however, to reduce the number of control systems required in each network because users would be able to eliminate an entire mainframe from the topology. This would enhance system performance by increasing the efficiency of the hardware and reducing costs for users.

Systems, devices, and methods disclosed herein achieve this goal by employing a concept known as GDDR multitenancy. GDDR multitenancy allows multiple GDDR-complexes managing different storage configurations, such as those shown in FIGS. 2A-2C and 3A-3C, to share the same set of control systems, e.g., 212, 232, 312, 322, 332, 342. These systems, methods and devices decrease the number of dedicated mainframe LPARs required to operate a plurality of GDDR complexes.

With the introduction of GDDR multitenancy, GDDR will now support running multiple GDDR instances on a single control system ("C-system"), each referred to as a C-instance. A managed system, or production system ("P-system"), may only have one active GDDR instance. A C-instance consists of a single GDDRMAIN address space and its dependent address spaces (e.g., GDDREVM, GDDR-WORK, GDDR scripts) running on a given z/OS system.

Each C-instance has a dedicated set of Mainframe Enablers (MFE) started tasks (e.g., SCF, SRDF Host Component, ConGroup). The combination of a C-instance and its set of MFE started tasks is known as an affinity group.

A set of C-instances and their managed P-systems connected via TCP/IP is known as a GDDR complex (a.k.a. GDDR-plex). One GDDR-plex manages a single set of consistent data, or for GDDR Tape a single tape profile dataset, and each GDDR-plex uses its own dedicated TCP/IP port. Different C-instances running on a single C-system are completely disjoint. That is, different GDDR-plexes operate completely independent of each other. C-instances cannot share MFE address spaces, and a single C-instance cannot be part of multiple GDDR-plexes. Each C-instance operates exclusively within its own set of address spaces. That is, a particular C-instance will not react to messages nor reply to WTORs issued by an address space outside of its affinity group. Likewise, each GDDR-plex operates exclusively within its own set of GDDR instances. Messages are never forwarded to a C-instance or P-system outside of a given GDDR-plex. GDDR multitenancy allows multiple GDDR-plexes managing different storage configurations to share the same set of C-systems, decreasing the number of mainframe LPARs that must be dedicated to GDDR and therefore reducing hardware costs for the customer.

FIG. 4 shows a geographically dispersed disaster restart ("GDDR") multitenancy system 400. For simplicity, the GDDR multitenancy system is depicted and discussed using two 2-site GDDR complexes. Those of skill in the art will recognize that the teachings, systems, methods, devices, etc. disclosed herein could also be implemented on larger GDDR complexes having varied topologies. Additionally, and with respect to claim language, the claimed embodiments could be implemented with any number of primary, secondary, tertiary, quaternary and more control instances being combined into a single LPAR. While we discuss embodiments in the context of primary and secondary, for clarity in terms of numbering, those of skill in the art will recognize that some GDDR topologies could be referred to as having a primary site and a tertiary site, without having a secondary site. In this topology, the term "tertiary" would be equivalent to the term "secondary" as used in this specification and in the claims.

The GDDR multitenancy system 400 of comprises a first GDDR complex 451 and a second GDDR complex 452. The first GDDR complex 451 has a first primary data storage device 416, and a first secondary data storage device 426. The first primary data storage device 416 and the first secondary data storage device 426 are geographically separated from one another. In embodiments, the amount of geographic separation can vary. The first GDDR complex 451 further comprises a first primary production system 415. In alternate embodiments, the first primary production system 425 could be located at the secondary data center 451. In yet alternate embodiments, the first GDDR complex 451 could have two or more production systems 415, 425. In yet additional embodiments, the first GDDR complex 451 could have no production systems 415, 425.

The primary data center 453 is communicatively coupled to the secondary data center 454 via at least one communication link 420, 421. Communication links 420, 421 support synchronous or asynchronous communication. The first GDDR complex 451 also includes a first primary control instance 412 and a first secondary control instance 422.

Similarly, the second GDDR complex 452 has a second primary data storage device 436, and a second secondary data storage device 446. The second primary data storage device 426 and the second secondary data storage device 446 are geographically separated from one another. In embodiments, the amount geographic separation can vary. The second GDDR complex 452 further comprises a second primary production system 435. In alternate embodiments, the second primary production system 445 could be located at the secondary data center 451. In yet alternate embodiments, the second GDDR complex 452 could have two or more production systems 435, 445. In yet alternate embodiments, the second GDDR complex 452 could have no production systems 435, 445.

The second GDDR complex 452 also includes a second primary control instance 432 and a second secondary control instance 422. In embodiments, the first primary control instance 412 and the second primary control instance 432 are located on a single LPAR 413. In this embodiment, computer functionality has been improved by reducing the number of required operating systems by one. In alternate embodiments, the first secondary control instance 422 and the second secondary control instance 442 are also located on a single LPAR 414. In this embodiment, computer functionality has been improved by reducing the total number of operating systems by two.

In some embodiments one or more data storage device 416, 426, 436, 446 could be a Dell EMC VMAX. As was discussed earlier, the data within data storage devices 416, 426, 436, 446 sharing the same GDDR complex should be redundant, or nearly redundant in the case of asynchronous connections.

Those of skill in the art will recognize that alternate embodiments could include alternate topologies, such as STAR configurations. Additionally, more GDDR complexes could be added to the network in additional embodiments. In these additional embodiments having more GDDR complexes, additional C-instances could be added to one of the single logical partitions 413, 414. Each time a control instance is added to a single LPAR, computer functionality is improved by reducing the number of necessary operating systems required for the GDDR multitenancy system 400 by one.

The embodiments disclosed herein could be employed on a GDDR VMAX. In these embodiments, each GDDR complex could manage a single set of consistent data using a dedicated C-system. In alternate embodiments, the teachings disclosed herein could be used in conjunction with a Dell EMC GDDR Tape product. In these embodiments, each GDDR complex could manage a single tape profile. In GDDR Tape configurations, a managed system may have a C-system role, and in that case the system does not support Multi-Tenancy. In alternate embodiments, the teachings disclosed herein could be used with GDDR VMAX and GDDR Tape.

Without losing the general applicability of embodiments described thus far, we now discuss implementation details for embodiments using Dell EMC products.

Support for multiple C-instances on the same C-system is largely made possible by a new mechanism we call message affinity. Each C-instance must have a unique GDDR subsystem name. This is specified using a GDD$xxxx DD DUMMY statement in the job control language (JCL), with xxxx being the GDDR subsystem name. We call this the GDDR connector. If none is specified, GDD$GDDR DD DUMMY is assumed. If a GDDR subsystem name is already in use by another active C-instance, GDDRMAIN will fail to start. Likewise, each C-instance must have a unique SCF subsystem name. This is specified using an SCF$xxxx DD DUMMY statement in the JCL, with xxxx being the SCF subsystem name. We call this the SCF connector. If none is specified, SCF$EMC DD DUMMY is assumed. If an SCF subsystem name is already in use by another active C-instance, GDDRMAIN will fail to start.

Specification of an SCF connector is limited to the GDDRMAIN started task JCL, as well as in all MFE started tasks (e.g., SCF, SRDF Host Component, ConGroup), and in certain batch utilities that interface with SCF. The SCF connector is what ties a C-instance to a set of MFE started tasks as well as what ties the MFE started tasks together. Each C-instance must have its own dedicated set of MFE started tasks, all with the same SCF connector.

A GDDR connector need only be specified in the GDDRMAIN JCL and in certain batch utilities that interface with GDDR. The GDDR connector is what ties GDDR address spaces together. For dependent address spaces (e.g., GDDREVM, GDDRWORK, GDDR scripts), the GDDR and SCF connectors are allocated dynamically and must not be specified in the JCL. TSO logon procs must not have GDDR or SCF connector DDs.

Each GDDRMAIN instance monitors all message traffic on that given system. A message is processed and/or forwarded only if message automation is enabled for that message ID and if the issuer has affinity with our C-instance. GDDR messages have affinity with our C-instance only if the issuer's GDDR connector matches ours. Likewise, MFE messages have affinity with our C-instance only if the issuer's SCF connector matches ours. Non-EMC messages are not subject to affinity checking. In addition, messages forwarded from remote systems or issued on another system in the same system complex (sysplex) are not subject to affinity checking, as affinity has already been verified on the local system.

Message affinity checking helps keep different GDDR-plexes fully isolated from each other and prevents a C-instance from reacting to a message that doesn't belong to it, either by processing it locally or by forwarding it to another system in the GDDR-plex to be processed there. It also prevents a C-instance from reacting to messages issued by any MFE started tasks running outside of a GDDR-managed configuration altogether.

FIG. 5 is an example of a first GDDR complex 451 and a second GDDR complex 452 sharing the same set of C-systems. FIG. 5 illustrates how methods disclosed herein isolate tasks and messages being exchanged between the two GDDR complexes 451, 452.

FIG. 6 shows a flow chart depicting steps for method embodiments. According to method embodiments, a method for providing a geographically dispersed disaster restart ("GDDR") multitenancy system comprising a first GDDR complex and a second GDDR complex, comprising the steps of: providing 610 the first GDDR complex, wherein the first GDDR complex comprises a first primary data storage device and a first secondary data storage device, wherein the first primary storage and the first secondary storage are geographically separated from one another; providing 614 a first primary control instance and a first secondary control instance in the first GDDR complex; providing 616 the second GDDR complex, wherein the second GDDR complex comprises a second primary data storage device and a second secondary data storage device, wherein the second primary storage and the second secondary storage are geographically separated from one another; providing 620 a second primary control instance and a second secondary control instance; and combining 622 the first primary control instance and the second primary control instance into a single logical partition.

In alternate embodiments, there could be steps for providing 612 a first primary production system operating on at least one logical partition located within the first GDDR complex and/or providing 618 a second primary production system operating on at least one logical partition located within the second GDDR complex.

Installation Considerations

Subsystem Name

Each GDDR-plex must have a unique GDDR subsystem name. The GDDR subsystem name must be 1 to 4 alphanumeric or national (i.e., $, #, or @) characters. The first character must be alphabetic or national (i.e., $, #, or @). When running multiple C-instances on the same C-system, Dell EMC recommends using the format GDDx, where x is a number from 1-9, starting with GDD1 and incrementing x by 1 for each additional C-instance. If running only one C-instance, Dell EMC recommends using the default subsystem name of GDDR.

All GDDRMAIN instances within the same GDDRPLEX must use the same GDDR subsystem name. This is to ensure global variable names are consistent between systems. If the subsystem name is inconsistent between systems in a GDDR-plex, degraded mode will be set.

Note: Each C-instance has a control block anchored in CSA called the GDDRSSVT, but it is not an actual SSVT, nor is GDDR a subsystem in the MVS sense of the word. We use the term GDDR subsystem to refer to field in the GDDRSSVT which is used to uniquely identify a C-instance.

JCL

Each C-instance must have its own set of GDDR and MFE PROCs (e.g., GDDRMAIN, GDDREVM, GDDRWORK, GDDRPROC, GDDRSCF, GDDRSRDF, GDDRCGRP). 'GDDR' must be replaced with the subsystem name (GDD1MAIN, etc.). Each GDDRMAIN PROC must have a unique SCF connector in the form of an SCF$xxxx DD DUMMY statement, otherwise the default SCF subsystem name of EMC is used. Likewise, each GDDRMAIN PROC must have a unique GDDR connector in the form of a GDD$xxxx DD DUMMY statement, otherwise the default subsystem name of GDDR is used.

If different C-instances will run different GDDR maintenance levels, separate TSO logon procs will be needed. When accessing the GDDR ISPF interface for a particular C-instance, the GDDR maintenance level of the TSO user's address space must match that of GDDRMAIN. TSO logon procs must not have GDDR or SCF connector DDs.

All batch jobs interfacing with GDDR (e.g., utilities provided in SAMPLIB) must have a GDDR connector matching that of the target C-instance. In addition, all batch jobs requiring SCF functionality must also have an SCF connector matching that of the target C-instance. The only exception is if the target C-instance is using the default GDDR and/or SCF subsystem names, in which case the connector DD is optional.

In order to run scripts in parallel across different C-instances on the same z/OS system, each C-instance must specify a unique Jobname Prefix on the Script JCL Parameters panel. This can be found from the GDDR Primary Options Menu under M (Maintenance)>P (Parms)>O (Options)>J (Script JCL Parameters). The 'Enforce' option to the right of 'Jobname Prefix' must be set to 'YES'.

Any automation may also need to be updated. Global variable names begin with GLOBAL.subsys, where subsys is the GDDR subsystem name. In practice, this has traditionally meant that all global variable names began with GLOBAL.GDDR. However, if the GDDR subsystem name is GDD1, for example, its global variable names will start with GLOBAL.GDD1. Likewise, software consoles started by GDDRMAIN were traditionally named GDDRCONx, where x is a number from 1-9. If the GDDR subsystem name is GDD1, for example, the console names will be GDD1CONx.

MFE Software and Dell EMC Symmetrix

Dell EMC recommends that each C-instance have its own dedicated GDDR gatekeepers. As long as GDDR script operations are serialized across C-instances, it may be possible to share GDDR gatekeepers among C-instances, for instance if one test GDDR instance is running alongside one production GDDR instance. Documented guidelines must be followed for allocation of MFE software gatekeepers across C-instances. Increasing the number of GDDR instances you run will cause an almost linear increase in the number of required gatekeepers.

Each C-instance must use its own dedicated set of MFE software group names; this includes ConGroup names, MSC group names, managed VDG names, GNS group names. Each instance must also use its own dedicated SnapVX snapshot names. If no Symmetrix units are shared between two instances, then it is allowed to use the same group names or snapshot names, but to keep operations of multiple C-instances manageable, it is still strongly recommended for each instance to use its own names.

Each C-instance must have its own SRDF Host Component subsystem name and command prefix.

C-instances can share Dell EMC Symmetrix units. However, MSC activation cannot occur simultaneously in two or more instances if they share a Symmetrix unit. In this case, only one of the activations will succeed; the other(s) will have to be re-driven.

Each C-instance must have dedicated SCF, SRDF Host Component (if applicable), and ConGroup (if applicable) parm files. This includes the required SITxxxxx members as documented in the GDDR product guide for the type of managed configuration.

Note: These considerations apply generally to operating multiple C-instances in a shared environment, whether the instances share C-systems or not.

GDDRPARM File

Different C-instances can share the same GDDRPARM deck. This is possible since all GDDRPARM statements must include a GDDR subsystem name in column 19. Each C-instance will only process GDDRPARM statements matching its GDDR subsystem name.

All GDDRPARM statements adhere to the following general format:

1--------10-------19---24-------------------------------
parm sys_site ssys value
Where
parm is the parameter type
sys_site is a site or system name, or may be either, depending on the particular parameter ssys is the GDDR subsystem name
value is the value (varies depending on the particular parameter)

Each C-instance must have its own dedicated TCP/IP port, which must be the same across the entire GDDR-plex.

Each C-instance must have its own dedicated DIV dataset.

CPCs can be shared among C-instances. However, managed LPARs cannot be shared. Dell EMC recommends that only one C-instance be using the CBU Activate/Undo capability.

Note: These considerations apply generally to operating multiple C-instances in a shared environment, whether the instances share C-systems or not.

Enabling Multi-GDDR

If C-instance(s) are already active on a particular z/OS system, a subsequent C-instance can only be started if multi-GDDR is enabled for all subsystems. This is done using the MULTI statement. If only one C-instance will ever be active on each z/OS system, the MULTI statement is not required for the subsystem. MULTI statements are processed at GDDRMAIN startup, but they can be reprocessed at any time using the F GDDRMAIN,PARM_REFRESH command, allowing multi-GDDR to be enabled for an active C-instance without recycling GDDRMAIN.

The format of the MULTI statement is as follows:

1--------10-------19---24-------------------------------------
MULTI sys_site ssys {ENABLE|DISABLE}

Multi-GDDR is only enabled for a GDDR instance if GDDRMAIN comes up on a system identified as a C-system for that instance and there is a MULTI statement with a value of ENABLE where ssys matches its GDDR subsystem name and sys_site matches the site or system name where the C-instance will run. Optionally, sys_site may be specified as an asterisk to match all sites/systems.

For example, subsystem GDD1 can be enabled for multi-GDDR on all C-systems as follows:

MULTI * GDD1 ENABLE

A MULTI statement with a value of DISABLE is equivalent to having no MULTI statement for that GDDR subsystem at all, for example:

MULTI * GDD1 DISABLE

To enable multi-GDDR for an active C-instance, add a MULTI ENABLE statement for that subsystem, and issue F GDDRMAIN,PARM_REFRESH (or recycle GDDRMAIN) on all systems in the affected GDDR-plex.

A P-system cannot run concurrently with any other GDDR instance on the same z/OS system. If a P-system attempts to start and one or more GDDR instances are already active on that z/OS system, error message GDDM290E is issued, and GDDRMAIN is terminated, for example:

GDDM290E Multiple GDDR subsystems not allowed on managed systems

If a C-system attempts to start and a P-system is already active on that z/OS system, error message GDDM613E is issued, and GDDRMAIN is terminated, for example:

GDDM613E P-system GDD1 is active on X117, multi-GDDR not supported

A C-instance that is not multi-GDDR enabled cannot run concurrently with any other C-instance on the same z/OS system. If a C-instance attempts to start and another C-instance that is not multi-GDDR enabled is already active on that z/OS system, error message GDDM614E is issued, and GDDRMAIN is terminated, for example:

GDDM614E Multi-GDDR is disabled for subsystem GDD1 active on X117

If one or more C-systems that are multi-GDDR enabled are active and another C-system that is not multi-GDDR enabled attempts to start on that z/OS system, error message GDDM611E is issued, and GDDRMAIN is terminated, for example:

GDDM611E Multi-GDDR is disabled for subsystem GDD3

Other GDDR instances active on X117:
GDD1
GDD2

If a C-system that is multi-GDDR enabled is started and any other C-instances active on that z/OS system are also C-systems with multi-GDDR enabled, informational message GDDM610I is issued, for example:

GDDM610I Multi-GDDR is enabled for subsystem GDD3

Other GDDR instances active on X117:
GDD1
GDD2

If a C-system that is multi-GDDR enabled is started and no other C-instance is active on that z/OS system, message GDDM610I will indicate None', for example:

GDDM610I Multi-GDDR is enabled for subsystem GDD1

Other GDDR instances active on X117: None

If a C-instance that is not multi-GDDR enabled (i.e., C-instance without MULTI ENABLE statement, P-system) is started and no other C-instance is active on that z/OS system, no multi-GDDR related messages are issued.

Other GDDR Installation and User Datasets

Different C-instances can run from the same GDDR installation datasets, such as LINKLIB, ISPPLIB, ISPSLIB, ISPMLIB, PROCLIB, PARMLIB, REXX, and RCXFE.

It is recommended to have a separate SAMPLIB for each C-instance so that it can be permanently customized with appropriate GDDR and SCF connectors.

Each C-instance must have its own dedicated Global Variable Backup datasets.

Each GDDR Tape C-instance must have its own GDDR Tape Profile PDS Separate GDDR parameter wizard datasets are recommended, such as LAPD (last activated parameter dataset), personal Global Variable Backup datasets, and parameter wizard work PDS.

Running Different GDDR Versions or Maintenance Levels on the Same C-System

When running multiple C-instances with different GDDR software versions or maintenance levels, only one version can use LNKLST. All other instances must use STEPLIB for all address spaces in the affinity group.

Each C-instance will load its own copy of modules GDDBENF1, GDDBENF2, GDDRXG1A, and GDDRSRB1 into dynamic LPA.

Note: When using LNKLST, please follow the steps documented in the GDDR Product Guide, Chapter Integrating GDDR, Section Update system parameter files, paragraphs about LINKLIB and REXX parameter file installation.

RACF

GDDR uses the same SAF profiles for all GDDR instances. It is therefore not possible to give the same users different authorizations with regards to GDDR in different GDDR instances.

Please refer to the GDDR Product Guide for required authorizations. Some of the profiles include procedure names and may need additional customization e.g. to allow each GDDR instance to issue MSC commands against the MFE STCs in its affinity group.

ISPF Interface

On entry to the ISPF interface, if more than one C-instance is active, the user will be prompted to select a C-instance, for example ------------GDDR-Select GDDR Subsystem--------------------Row 1 to 2 of 2
Command===>Scroll===>CSR This system has more than one active GDDR instance.
Please select a GDDR instance from the list below.
Userid: JOHNDOE GDDR version: V5.2.0
Previous GDDR instance: GDD1
Enter S next to subsystem to select
Press <F3> to exit
Sel GDDR GDDRPLEX GDDRMAIN GDDRMAIN SCF Maintenance Configuration
SSys Name Jobname JobID Sfx Level Type
_GDDR GDDR_52 GDDRMAIN STC03767 EMC V5.2.0 BASE Con Star-HA (CAX)
_GDD1 GDD1_52 GDD1MAIN STC03773 GAT V5.2.0 GD52001 SQAR In GDDR 5.1 and below, the TSO user's address space must match the GDDR version of the GDDRMAIN address space for the selected C-instance; otherwise access to that instance is prohibited.

In GDDR 5.2, if the GDDR maintenance level of the TSO user's address space (i.e., version and PTF level) doesn't exactly match that of the GDDRMAIN address space for the selected C-instance, the following popup is displayed. From this panel, the REFRESH command can be used to re-determine the maintenance level for the TSO user's address space. If the GDDR version does not match, access to that C-instance is prohibited.

```
+----------------------------------------------------------+
| Command ===>                                             |
|                                                          |
| The GDDR maintenance level for JOHNDOE does not match    |
| that of GDDRMAIN for the selected GDDR instance GDD1     |
|                                                          |
|     Jobname : JOHNDOE | GDD1MAIN            |
|     GDDR Version : V5.2.0 | V5.2.0          |
|     Maintenance Level : BASE | GD52001      |
|     Maintenance Date : 05/04/17 | 05/10/17  |
|     Maintenance CRC : 52CDEF5C | 6D1F2C10   |
|                                                          |
| Enter                                                    |
| REFRESH to re-determine maintenance level for JOHNDOE    |
| CONTINUE to proceed to GDDR instance GDD1 ***            |
| END or press PF3 to exit                                 |
|                                                          |
| *** WARNING: Results are unpredictable.                  |
|                                                          |
| F1=HELP    F2=SPLIT    F3=END    F4=RETURN               |
| F5=RFIND   F6=RCHANGE  F7=UP     F8=DOWN                 |
+----------------------------------------------------------+
```

After successfully selecting an instance, the normal GDDR Primary Options Menu is displayed, for example:

```
-------------------GDDR - Primary Options Menu for GDD1_52------------------
Option ==>
P Profile      Update personal GDDR ISPF Profile    This System: LB04M41
M Maintenance     GDDR Setup and Maintenance           This Site: DC1
G GDDR Config   View GDDR configuration              This region: 1
C Checkup       Perform pre-script checkup         Master-C: LB04M41
S Scripts       Run GDDR Scripts                   Primary Site: DC1
T Timing        View GDDR Script Statistics        Primary DASD: DC1
A Actions    Perform GDDR Actions                    Automation: ON
ST eSTEM      Run Started Task Execution Manager    Planned script: None
                        Unplanned script: None
                        Appl ID.: GDD1
```

Dell EMC Geographically Dispersed Disaster Restart V5.2.0 GD52001 (Oct. 23, 2017)

© 2007-2018 Dell Inc. or its subsidiaries. All rights reserved.

Select an option and press <Enter>

Press <F3> to Terminate GDDR ISPF

GDDR uses the selected GDDR subsystem name as the ISPF application ID. When choosing GDDR subsystem names, please ensure that they do not clash with existing ISPF application IDs in use in your environment.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A geographically dispersed disaster restart ("GDDR") multitenancy system comprising a first GDDR complex and a second GDDR complex, wherein;
   the first GDDR complex comprises:
      a first primary data storage device and a first secondary data storage device, wherein the first primary storage and the first secondary storage devices are geographically separated from one another; and
      a first primary control instance and a first secondary control instance; and
   the second GDDR complex comprises:
      a second primary data storage device and a second secondary data storage device, wherein the second primary storage and the second secondary storage devices are geographically separated from one another; and
      a second primary control instance and a second secondary control instance; the first GDDR complex and the second GDDR complex are run as a single instance of an operating system;
   a third GDDR complex communicatively coupled to the first and second GDDR complexes, wherein the third GDDR further comprises:
      a first tertiary data storage device; and
      a first tertiary control instance, wherein the first tertiary control instance is located on the single logical partition.

2. A method for providing a geographically dispersed disaster restart ("GDDR") multitenancy system comprising a first GDDR complex and a second GDDR complex, comprising the steps of:

provide the first GDDR complex, wherein the first GDDR complex comprises a first primary data storage device and a first secondary data storage device, wherein the first primary storage and the first secondary storage are geographically separated from one another;

providing a first primary control instance and a first secondary control instance in the first GDDR complex;

providing the second GDDR complex, wherein the second GDDR complex comprises a second primary data storage device and a second secondary data storage device, wherein the second primary storage and the second secondary storage are geographically separated from one another;

providing a second primary control instance and a second secondary control instance;

running the first GDDR complex and the second GDDR complex as a single instance of an operating system; and monitoring message traffic within the first GDDR complex or the second GDDR complex by determining if a Symmetrix control facility ("SCF") connector contained within an issuer's address space matches an SCF connector associated with the first GDDR complex or the second GDDR complex, respectively.

3. A method for providing a geographically dispersed disaster restart ("GDDR") multitenancy system comprising a first GDDR complex and a second GDDR complex, comprising the steps of:

providing the first GDDR complex, wherein the first GDDR complex comprises a first primary data storage device and a first secondary data storage device, wherein the first primary storage and the first secondary storage are geographically separated from one another;

providing a first primary control instance and a first secondary control instance in the first GDDR complex;

providing the second GDDR complex, wherein the second GDDR complex comprises a second primary data storage device and a second secondary data storage device, wherein the second primary storage and the second secondary storage are geographically separated from one another;

providing a second primary control instance and a second secondary control instance;

running the first GDDR complex and the second GDDR complex as a single instance of an operating system; and monitoring message traffic within the first GDDR complex or the second GDDR complex by determining if a GDDR connector contained within an issuer's address space matches a GDDR connector associated with the first GDDR complex or the second GDDR complex, respectively.

4. A computer executable product fixed in a non-transitory medium for providing a geographically dispersed disaster restart ("GDDR") multitenancy system comprising a first GDDR complex and a second GDDR complex configured for performing the steps of:

providing the first GDDR complex, wherein the first GDDR complex comprises a first primary data storage device and a first secondary data storage device, wherein the first primary storage and the first secondary storage are geographically separated from one another;

providing a first primary control instance and a first secondary control instance in the first GDDR complex;

providing a the second GDDR complex, wherein the second GDDR complex comprises a second primary data storage device and a second secondary data storage device, wherein the second primary storage and the second secondary storage are geographically separated from one another;

providing a second primary control instance and a second secondary control instance;

the first GDDR complex and the second GDDR complex are run as a single instance of an operating system; and monitoring message traffic within the first GDDR complex or the second GDDR complex by determining if a Symmetrix control facility ("SCF") connector contained within an issuer's address space matches an SCF connector associated with the first GDDR complex or the second GDDR complex, respectively.

5. A computer executable product fixed in a non-transitory medium for providing a geographically dispersed disaster restart ("GDDR") multitenancy system comprising a first GDDR complex and a second GDDR complex configured for performing the steps of:

providing the first GDDR complex, wherein the first GDDR complex comprises a first primary data storage device and a first secondary data storage device, wherein the first primary storage and the first secondary storage are geographically separated from one another;

providing a first primary control instance and a first secondary control instance in the first GDDR complex;

providing a the second GDDR complex, wherein the second GDDR complex comprises a second primary data storage device and a second secondary data storage device, wherein the second primary storage and the second secondary storage are geographically separated from one another;

providing a second primary control instance and a second secondary control instance;

the first GDDR complex and the second GDDR complex are run as a single instance of an operating system; and monitoring message traffic within the first GDDR complex or the second GDDR complex by determining if a GDDR connector contained within an issuer's address space matches a GDDR connector associated with the first GDDR complex or the second GDDR complex, respectively.

* * * * *